United States Patent
Gao et al.

(10) Patent No.: US 12,518,769 B2
(45) Date of Patent: Jan. 6, 2026

(54) AUDIO WATERMARK ADDITION METHOD, AUDIO WATERMARK PARSING METHOD, DEVICE, AND MEDIUM

(71) Applicant: HUAWEI TECHNOLOGIES CO., LTD., Shenzhen (CN)

(72) Inventors: Liang Gao, Shanghai (CN); Xiang Shi, Shenzhen (CN); Manyi Wang, Suzhou (CN); Guojie Huang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 365 days.

(21) Appl. No.: 18/192,571

(22) Filed: Mar. 29, 2023

(65) Prior Publication Data

US 2023/0238008 A1    Jul. 27, 2023

Related U.S. Application Data

(63) Continuation of application No. PCT/CN2021/118202, filed on Sep. 14, 2021.

(30) Foreign Application Priority Data

Sep. 30, 2020    (CN) .......................... 202011066454.0

(51) Int. Cl.
*G10L 19/018*    (2013.01)
*G10L 25/21*    (2013.01)
*G10L 25/51*    (2013.01)

(52) U.S. Cl.
CPC ............ *G10L 19/018* (2013.01); *G10L 25/21* (2013.01); *G10L 25/51* (2013.01)

(58) Field of Classification Search
CPC ........ G10L 19/018; G10L 25/21; G10L 25/51
See application file for complete search history.

(56) References Cited

U.S. PATENT DOCUMENTS

| | | | |
|---|---|---|---|
| 10,043,527 B1 * | 8/2018 | Gurijala | G10L 19/018 |
| 2003/0103645 A1 | 6/2003 | Levy et al. | |
| 2009/0157204 A1 * | 6/2009 | Smith | G11B 20/00181 700/94 |
| 2009/0193255 A1 * | 7/2009 | Baum | H04L 9/32 713/176 |

FOREIGN PATENT DOCUMENTS

| | | |
|---|---|---|
| EP | 3509268 A1 | 7/2019 |
| KR | 20040035043 A | 4/2004 |

* cited by examiner

*Primary Examiner* — Richemond Dorvil
*Assistant Examiner* — Ethan Daniel Kim
(74) *Attorney, Agent, or Firm* — Leydig, Voit & Mayer, Ltd.

(57) ABSTRACT

An audio watermark addition method carried out on a playback terminal is described. The playback terminal obtains first audio in real time and embeds an audio watermark within the first audio. The audio watermark is associated with the playback terminal, and the playback terminal plays the first audio including the embedded audio watermark.

19 Claims, 14 Drawing Sheets

AUDIO WATERMARK ADDITION METHOD, AUDIO WATERMARK PARSING METHOD, DEVICE, AND MEDIUM

CROSS-REFERENCE TO RELATED APPLICATIONS

This application is a continuation of International Application No. PCT/CN2021/118202, filed on Sep. 14, 2021, which claims priority to Chinese Patent Application No. 202011066454.0, filed on Sep. 30, 2020 and entitled. The disclosures of the aforementioned applications are hereby incorporated by reference in their entireties.

TECHNICAL FIELD

This application relates to the electronics field, and in particular, to an audio watermark addition method, an audio watermark parsing method, a device, and a medium.

BACKGROUND

A watermarking technology is a commonly used picture processing method. A watermark is added to an important picture, so that a source of the picture can be found through querying based on the watermark during spreading of the picture. This prevents a disseminator photographing or disseminating the picture at will, and serves as a deterrent and enables source tracing and finding of an accountable party.

Currently, there is also a similar requirement in the audio field. For example, in a remote audio and video conference, content from the conference may be leaked, resulting in disclosure of confidential commercial or personal information and causing an adverse effect. A main means thereof is as follows: A device such as a mobile phone or a recording pen secretly photographs or records the content from the conference on a side of a remote terminal, and sends the secretly recorded audio or video file to another person. Eventually, the file is spread on the Internet, causing the adverse effect.

According to an audio watermark addition method in the conventional technology, an watermarked audio is mainly obtained by processing audio offline in a later stage. However, in a scenario of live streaming a conference, an online real-time audio stream cannot be effectively processed.

Therefore, the problem in the conventional technology needs to be resolved.

SUMMARY

Embodiments of this application provide an audio watermark addition method, an audio watermark parsing method, a device, and a medium, to resolve a problem of adding an audio watermark in real time.

In view of this, a first aspect of embodiments of this application provides an audio watermark addition method. The method includes: A playback terminal obtains first audio in real time; the playback terminal embeds an audio watermark into the first audio, where the audio watermark is associated with the playback terminal; and the playback terminal plays the first audio embedded with the audio watermark.

In this embodiment, the playback terminal obtains the first audio in real time; the playback terminal embeds the audio watermark into the first audio, where the audio watermark is associated with the playback terminal; and the playback terminal plays the first audio embedded with the audio watermark. In this way, in a scenario of playing audio in real time, the playback terminal adds the audio watermark to an audio stream in real time, so that a device can determine the playback terminal based on the audio watermark when performing watermark parsing in a later stage, facilitating source tracing after the first audio is trans-recorded.

Optionally, that the playback terminal embeds an audio watermark into the first audio includes: The playback terminal determines a first target frame that meets a first preset condition and that is in the first audio; the playback terminal determines a second target frame that meets a second preset condition and that is after the first target frame, where the first target frame is used to mark the second target frame; and the playback terminal embeds the audio watermark into the second target frame.

In this embodiment, in a process of processing the first audio in real time, the playback terminal determines the first target frame based on the first preset condition, then determines the second target frame based on the second preset condition, and finally embeds the audio watermark into the second target frame. In this manner, the playback terminal can accurately find, in the process of real-time processing, an appropriate position in which the audio watermark is embedded into the first audio.

Optionally, that the playback terminal determines a first target frame that meets a first preset condition and that is in the first audio includes: The playback terminal determines, when a sampling rate of the first audio is greater than or equal to a first threshold, an audio frame with a maximum value of a low frequency portion in a first interval, as the first target frame; or the playback terminal determines, when a sampling rate of the first audio is less than a first threshold, an audio frame including a first characteristic sound, as the first target frame.

In this embodiment, when the sampling rate of the first audio is greater than or equal to the first threshold, the playback terminal determines the audio frame with the maximum value of the low frequency portion in the first interval, as the first target frame; or when the sampling rate of the first audio is less than the first threshold, the playback terminal determines the first target frame by determining the first characteristic sound, with no need to additionally embed a synchronization frame marker. In this way, it is ensured that the first target frame that marks the position in which the watermark is embedded can be found in the first audio, regardless of whether the sampling rate of the first audio is greater than or less than the first threshold.

Optionally, after the playback terminal determines, when the sampling rate of the first audio is greater than or equal to the first threshold, the audio frame with the maximum value of the low frequency portion in the first interval, as the first target frame, the method further includes: The playback terminal adds a synchronization frame marker to the first target frame.

In this embodiment, when the sampling rate of the first audio is greater than or equal to the first threshold, the synchronization frame marker is added to the first target frame, so that a parsing terminal can quickly locate the first target frame based on the synchronization frame marker when performing parsing subsequently.

Optionally, that the playback terminal adds a synchronization frame marker to the first target frame includes: The playback terminal obtains a first sampling point, where the first sampling point is a sampling point in an intermediate frequency portion; and the playback terminal increases an energy value of the first sampling point, so that a ratio of the energy value of the first sampling point to an energy value of the low frequency portion is greater than or equal to a second threshold.

In this embodiment, the playback terminal determines in real time a target frame that meets the first preset condition and that is in the first audio, as the first target frame or the second target frame, and then increases the energy value of the first sampling point in the intermediate frequency portion of the first target frame or the second target frame, so that the ratio of the energy value of the first sampling point to the energy value of the low frequency portion is greater than or equal to a preset ratio, implementing addition of the synchronization frame marker.

Optionally, that the playback terminal determines, when a sampling rate of the first audio is less than a first threshold, an audio frame including a first characteristic sound, as the first target frame includes: When the first characteristic sound is detected and duration of the first characteristic sound is greater than or equal to preset duration, the playback terminal determines the audio frame including the first characteristic sound, as the first target frame.

In this embodiment, the first characteristic sound may be a human voice. Alternatively, when a particular speech is detected in a state in which human voice detection is enabled, a target frame in which the particular speech is located is determined as the first target frame, ensuring that the watermark can be subsequently embedded into the target frame in which speech information is recorded.

Optionally, that the playback terminal determines a second target frame that meets a second preset condition and that is after the first target frame includes: The playback terminal determines a target frame with an energy value of an intermediate frequency portion greater than or equal to a third threshold and less than a fourth threshold, as the second target frame.

In this embodiment, the second target frame is a target frame that is after the first target frame. Because the second target frame is added to the first audio in real time, it cannot be ensured that each frame that is after the first target frame and that is in the first audio is suitable to be used as the second target frame. Therefore, a criterion for the second target frame needs to be determined. A target frame is used as the second target frame only when the target frame meets the second preset condition.

Optionally, that the playback terminal embeds the audio watermark into the third target frame includes: The playback terminal obtains a first sequence corresponding to the audio watermark, where the first sequence includes at least one element; the playback terminal obtains at least one second sampling point from the third target frame; and the playback terminal embeds the at least one element in the first sequence into the at least one second sampling point, respectively, where one element in the first sequence corresponds to one second sampling point.

In this embodiment, to embed the audio watermark into the first audio in real time, the playback terminal searches, in a time sequence, frames that are after the first target frame for the second target frame that meets the preset condition, and embeds the audio watermark into the second target frame. In a process of embedding the audio watermark, the playback terminal changes an energy ratio of energy values of different portions of a sampling point in the second target frame in time domain and/or frequency domain, implementing real-time embedding of the audio watermark. The embedded watermark has a strong anti-interference capability when the audio is trans-recorded, because the watermark can be propagated through a digital channel or an air channel.

Optionally, that the playback terminal embeds the at least one element in the first sequence into the at least one second sampling point, respectively includes: The playback terminal adjusts an energy ratio of energy values of different portions of the second sampling point in time domain and/or frequency domain, where an energy ratio of one second sampling point is associated with one element in the first sequence.

In this embodiment, optionally, a specific manner in which the playback terminal adjusts the energy ratio of the energy values of the different portions of the second sampling point in time domain and/or frequency domain may be as follows: increasing an energy value of a first half of a first sub-sampling point, so that a ratio of the energy value of the first half to an energy value of a second half of the first sub-sampling point is greater than or equal to a fifth threshold, and recording the first sub-sampling point as 1, where the first sub-sampling point is one of the at least one second sampling point; and increasing an energy value of a second half of a second sub-sampling point, so that a ratio of the energy value of the second half to an energy value of a first half of the second sampling point is greater than or equal to the fifth threshold, and recording the second sub-sampling point as 0.

Optionally, after the playback terminal embeds the at least one element in the first sequence into the at least one second sampling point, respectively, the method further includes: when a ratio of a high-energy portion to a low-energy portion of the second sampling point is less than the fifth threshold, increasing an energy value of the high-energy portion of the second sampling point.

Optionally, after the playback terminal obtains the first sequence corresponding to the audio watermark, the method further includes: the playback terminal adds a check bit to the first sequence, where the check bit is used to verify transmission integrity of the first sequence.

A second aspect of embodiments of this application provides an audio watermark parsing method. The method includes: A parsing terminal obtains first audio, where the first audio is embedded with an audio watermark, the audio watermark is associated with a playback terminal, and the playback terminal is configured to embed the audio watermark into the first audio in real time; the parsing terminal parses the first audio to obtain the audio watermark; and the parsing terminal determines the playback terminal based on the audio watermark.

This embodiment of this application provides the audio watermark parsing method. The method includes: The parsing terminal obtains the first audio, where the first audio is embedded with the audio watermark, the audio watermark is associated with the playback terminal, and the playback terminal is configured to embed the audio watermark into the first audio in real time; the parsing terminal parses the first audio to obtain the audio watermark; and the parsing terminal determines the playback terminal based on the audio watermark. In this way, the parsing terminal can determine, based on the audio watermark, the playback terminal that adds the audio watermark to the first audio.

Optionally, before the parsing terminal parses the first audio to obtain the audio watermark, the method further includes: The parsing terminal determines a first target frame that meets a first preset condition and that is in the first audio; the parsing terminal determines a second target frame that meets a second preset condition and that is after the first target frame; and that the parsing terminal parses the first audio to obtain the audio watermark includes: The parsing terminal parses the second target frame to obtain the audio watermark.

In this embodiment, because the playback terminal adds the audio watermark to the first audio in real time, it cannot be ensured that each frame in the first audio meets a condition for embedding a watermark. Therefore, in a solution of embedding an audio watermark in real time, embedding cannot be performed according to a preset rule like offline watermark embedding is performed. Instead, the first target frame and the second target frame need to be determined based on the first preset condition and the second preset condition, respectively. Therefore, when performing parsing, the parsing terminal also needs to parse the first target frame and the second target frame based on the same conditions.

Optionally, when a sampling rate of the first audio is less than a first threshold, that the parsing terminal determines a first target frame that meets a first preset condition and that is in the first audio includes: The parsing terminal determines a target frame that includes a first characteristic sound with duration greater than or equal to preset duration and that is in the first audio, as the first target frame.

In this embodiment, when the sampling rate of the first audio is greater than or equal to the first threshold, the parsing terminal determines an audio frame with a maximum value of a low frequency portion in a first interval, as the first target frame; or when the sampling rate of the first audio is less than the first threshold, the parsing terminal determines the first target frame by determining the first characteristic sound, with no need to additionally perform parsing to obtain a synchronization frame marker. In this way, it is ensured that the parsing terminal can find, in the first audio, the first target frame that marks a position in which the watermark is embedded, regardless of whether the sampling rate of the first audio is greater than or less than the first threshold.

Optionally, when a sampling rate of the first audio is greater than or equal to a first threshold, that the parsing terminal determines a first target frame that meets a first preset condition and that is in the first audio includes: The parsing terminal obtains, frame by frame, a first ratio of an energy value of an intermediate frequency portion to an energy value of a low frequency portion in the first audio; when obtaining an initial target frame with a first ratio greater than or equal to a second threshold, the parsing terminal detects, in a sliding window manner, frames that are after the initial target frame and that are in the first audio, to obtain a second ratio of an energy value of an intermediate frequency portion to an energy value of a low frequency portion in each sliding window; and the parsing terminal determines a frame in which a sliding window with a largest second ratio is located, as the first target frame.

In this embodiment, the parsing terminal obtains, frame by frame, a first ratio of an energy value of an intermediate frequency portion to an energy value of a low frequency portion of a sampling point in each frame. When finding a first sampling point with a first ratio greater than or equal to the second threshold, the parsing terminal determines a target frame in which the first sampling point is located, as the initial target frame. However, one frame has 2048 sampling points, and the first sampling points are only some of the 2048 sampling points. Therefore, after the first sampling point that meets the first ratio is found, there may be an offset between the first target frame in which the first sampling point is actually located and the initial target frame in which the first sampling point is currently located. To resolve the problem, the parsing terminal needs to detect, frame by frame in the sliding window manner, the frames that are after the initial target frame and that are in the first audio, to obtain the second ratio of the energy value of the intermediate frequency portion to the energy value of the low frequency portion in each sliding window; and determines the frame in which the sliding window with the largest second ratio is located, as the first target frame. In this way, a parsing deviation is prevented.

Optionally, the first target frame includes a synchronization frame marker, and that the parsing terminal determines a frame in which a sliding window with a largest second ratio is located, as the first target frame includes: The parsing terminal obtains a first sampling point with a largest energy value of an intermediate frequency portion from the sliding window with the largest second ratio; the parsing terminal obtains a third sampling point that is earlier than the first sampling point for a preset length; the parsing terminal determines a portion with a ratio of an energy value of the first sampling point to an energy value of the third sampling point greater than a seventh threshold, as the synchronization frame marker; and the parsing terminal determines, based on the synchronization frame marker, the frame in which the sliding window with the largest second ratio is located, as the first target frame.

In this embodiment, according to the method for detecting the synchronization frame marker, the synchronization frame marker is determined by detecting a first ratio of an energy value of an intermediate frequency portion to an energy value of a low frequency portion in the first audio. However, in an actual work process, the following case may also exist in original content (that is, non-watermarked content) of the first audio: A ratio of an energy value of an intermediate frequency portion to an energy value of a low frequency portion is greater than the first ratio. This results in erroneous detection of the synchronization frame marker. To resolve the problem, the parsing terminal determines the synchronization frame marker based on the ratio of the first sampling point to the third sampling point that is earlier than the first sampling point for the preset length, eliminating occurrence of erroneous detection.

Optionally, that the parsing terminal determines a second target frame that meets a second preset condition and that is after the first target frame includes: The parsing terminal separately obtains, from frames that are after the first target frame, candidate target frames with an energy value of an intermediate frequency portion greater than or equal to a third threshold and less than a fourth threshold; and the parsing terminal determines, from the candidate target frames, a target frame with an energy ratio of energy values of different portions in time domain and/or frequency domain greater than or equal to a fifth threshold, as the second target frame.

In this embodiment, after detecting the first target frame, the parsing terminal may continue to search for, with the first target frame as a positioning frame, the second target frame that is after the first target frame. The second target frame is embedded with the audio watermark and meets the second preset condition. The parsing terminal can quickly find, based on the second preset condition, the second target frame that is after the first target frame.

Optionally, that the parsing terminal parses the second target frame to obtain the audio watermark includes: The parsing terminal obtains a second sampling point from the second target frame, where the second sampling point is a sampling point whose energy ratio is greater than or equal to the fifth threshold and that is in the second target frame; the parsing terminal separately obtains an energy ratio of energy values of different portions of the second sampling point in time domain and/or frequency domain; and the parsing terminal obtains a first element associated with the energy ratio, where the first element is an element in a first sequence recorded in the audio watermark.

In this embodiment, optionally, the first sequence includes a check bit. In this case, after the parsing terminal generates the first sequence in a parsing order based on at least one digit in the second target frame, the method further includes: determining, based on the check bit, whether the first sequence is complete; and if the first sequence is complete, converting the first sequence into a decimal sequence, or if the first sequence is incomplete, ignoring the first sequence.

Optionally, before the parsing terminal parses the second target frame to obtain the audio watermark, the method further includes: The parsing terminal adjusts a length value of a first length based on duration of the second target frame, where larger duration of the second target frame indicates a larger value of the first length. The parsing terminal separately removes energy values of portions that are of the first length and that are in a head portion and a tail portion of the second target frame.

Optionally, in the method, a plurality of watermark detection cycles are included, one audio watermark is separately obtained through parsing in each of the watermark detection cycles, and the method further includes: determining, as the watermark of the first audio, the audio watermark that occurs most frequently from the audio watermarks that are obtained through parsing in the plurality of watermark detection cycles.

In this embodiment, the plurality of watermark parsing cycles are included in the first audio, one first target frame and one second target frame are included in each cycle, and the same audio watermark is embedded in each watermark detection cycle. In an actual parsing process, the parsing terminal may encounter some parsing errors, resulting in a case that not all audio watermarks obtained through parsing in all the watermark detection cycles are same sequences. When a parsing error occurs, an erroneous audio watermark obtained from erroneous parsing is always random and does not repeat itself. Therefore, from the audio watermarks that are obtained through parsing in the plurality of watermark detection cycles, the audio watermark that occurs most frequently can be determined as the correct audio watermark. In the multi-cycle determining manner, the correct watermark embedded into the first audio is obtained through accurate parsing, further preventing the parsing terminal from performing erroneous parsing.

A third aspect of embodiments of this application provides a playback terminal, including: an obtaining unit, configured to obtain first audio in real time; an execution unit, configured to embed an audio watermark into the first audio obtained by the obtaining unit, where the audio watermark is associated with the playback terminal; and a playback unit, configured to play the first audio into which the execution unit embeds the audio watermark.

Optionally, the execution unit is further configured to: determine a first target frame that meets a first preset condition and that is in the first audio; determine a second target frame that meets a second preset condition and that is after the first target frame, where the first target frame is used to mark the second target frame; and embed the audio watermark into the second target frame.

Optionally, the execution unit is further configured to: determine, when a sampling rate of the first audio is greater than or equal to a first threshold, an audio frame with a maximum value of a low frequency portion in a first interval, as the first target frame; or determine, when a sampling rate of the first audio is less than a first threshold, an audio frame including a first characteristic sound, as the first target frame.

Optionally, when the sampling rate of the first audio is greater than or equal to the first threshold, the execution unit is further configured to: add a synchronization frame marker to the first target frame.

Optionally, the execution unit is further configured to: obtain a first sampling point, where the first sampling point is a sampling point in an intermediate frequency portion; and increase an energy value of the first sampling point, so that a ratio of the energy value of the first sampling point to an energy value of the low frequency portion is greater than or equal to a second threshold.

Optionally, when the sampling rate of the first audio is less than the first threshold, the execution unit is further configured to: when the first characteristic sound is detected and duration of the first characteristic sound is greater than or equal to preset duration, determine the audio frame including the first characteristic sound, as the first target frame.

Optionally, the execution unit is further configured to: determine a target frame with an energy value of an intermediate frequency portion greater than or equal to a third threshold and less than a fourth threshold, as the second target frame.

Optionally, the execution unit is further configured to: obtain a first sequence corresponding to the audio watermark, where the first sequence includes at least one element; obtain at least one second sampling point from the third target frame; and embed the at least one element in the first sequence into the at least one second sampling point, respectively, where one element in the first sequence corresponds to one second sampling point.

Optionally, the execution unit is further configured to: adjust an energy ratio of energy values of different portions of the second sampling point in time domain and/or frequency domain, where an energy ratio of one second sampling point is associated with one element in the first sequence.

For beneficial effects of the third aspect of embodiments of this application, refer to the first aspect. Details are not described herein again.

A fourth aspect of embodiments of this application provides a parsing terminal, including: an obtaining unit, configured to obtain first audio, where the first audio is embedded with an audio watermark, the audio watermark is associated with a playback terminal, and the playback terminal is configured to embed the audio watermark into the first audio in real time; a parsing unit, configured to parse the first audio obtained by the obtaining unit, to obtain the audio watermark; and an execution unit, configured to determine the playback terminal based on the audio watermark obtained through parsing performed by the parsing unit.

Optionally, the parsing unit is further configured to: determine a first target frame that meets a first preset condition and that is in the first audio; determine a second target frame that meets a second preset condition and that is after the first target frame; and parse the second target frame to obtain the audio watermark.

Optionally, when a sampling rate of the first audio is less than a first threshold, the parsing unit is further configured to: determine a target frame that includes a first characteristic sound with duration greater than or equal to preset duration and that is in the first audio, as the first target frame.

Optionally, when a sampling rate of the first audio is greater than or equal to a first threshold, the parsing unit is further configured to: obtain, frame by frame, a first ratio of an energy value of an intermediate frequency portion to an energy value of a low frequency portion in the first audio; when obtaining an initial target frame with a first ratio greater than or equal to a second threshold, detect, in a sliding window manner, frames that are after the initial target frame and that are in the first audio, to obtain a second ratio of an energy value of an intermediate frequency portion to an energy value of a low frequency portion in each sliding window; and determine a frame in which a sliding window with a largest second ratio is located, as the first target frame.

Optionally, the first target frame includes a synchronization frame marker, and the parsing unit is further configured to: obtain a first sampling point with a largest energy value of an intermediate frequency portion from the sliding window with the largest second ratio; obtain a third sampling point that is earlier than the first sampling point for a preset length; determine a portion with a ratio of an energy value of the first sampling point to an energy value of the third sampling point greater than a seventh threshold, as the synchronization frame marker; and determine, based on the synchronization frame marker, the frame in which the sliding window with the largest second ratio is located, as the first target frame.

Optionally, the parsing unit is further configured to: separately obtain, from frames that are after the first target frame, candidate target frames with an energy value of an intermediate frequency portion greater than or equal to a third threshold and less than a fourth threshold; and determine, from the candidate target frames, a target frame with an energy ratio of energy values of different portions in time domain and/or frequency domain greater than or equal to a fifth threshold, as the second target frame.

Optionally, the parsing unit is further configured to: obtain a second sampling point from the second target frame, where the second sampling point is a sampling point whose energy ratio is greater than or equal to the fifth threshold and that is in the second target frame; separately obtain an energy ratio of energy values of different portions of the second sampling point in time domain and/or frequency domain; and obtain a first element associated with the energy ratio, where the first element is an element in a first sequence recorded in the audio watermark.

Optionally, a plurality of watermark detection cycles are included in the first audio, one audio watermark is separately obtained through parsing in each of the watermark detection cycles, and the parsing unit is further configured to: determine, as the watermark of the first audio, the audio watermark that occurs most frequently from the audio watermarks that are obtained through parsing in the plurality of watermark detection cycles.

For beneficial effects of the fourth aspect of embodiments of this application, refer to the second aspect. Details are not described herein again.

A fifth aspect of embodiments of this application provides an electronic device. The electronic device includes an interaction apparatus, an input/output (I/O) interface, a processor, and a memory. The memory stores program instructions. The interaction apparatus is configured to obtain an operation instruction input by a user. The processor is configured to execute the program instructions stored in the memory, to perform the method according to any one of the optional implementations of the first aspect or the second aspect.

A sixth aspect of embodiments of this application provides a computer-readable storage medium, including instructions. When the instructions are run on a computer device, the computer device is enabled to perform the method according to any one of the optional implementations of the first aspect or the second aspect.

DESCRIPTION OF EMBODIMENTS

Figure 1:
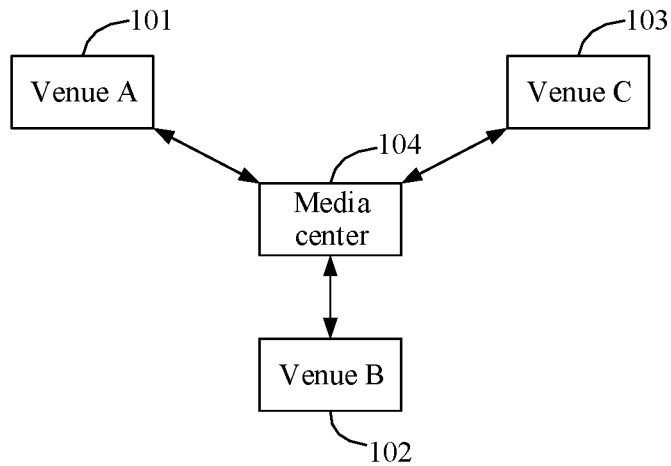
FIG. 1 is a schematic diagram of a usage scenario of an audio watermark addition method according to an embodiment of this application.

Embodiments of the present disclosure provide an audio watermark addition method, an audio watermark parsing method, a device, and a medium, to resolve a problem of adding an audio watermark in real time.

To make persons skilled in the art understand the solutions in this application better, the following clearly and completely describes the technical solutions in embodiments of this application with reference to the accompanying drawings in embodiments of this application. It is clear that the described embodiments are merely some but not all of embodiments of this application. All other embodiments obtained by persons of ordinary skill in the art based on embodiments of this application without creative efforts shall fall within the protection scope of this application.

In the specification, claims, and accompanying drawings of this application, the terms "first", "second", "third", "fourth", and so on (if existent) are intended to distinguish between similar objects but do not necessarily indicate a specific order or sequence. It should be understood that the data used in such a way are interchangeable in appropriate circumstances, so that embodiments described herein can be implemented in an order other than the content illustrated or described herein. In addition, terms such as "include", "have", and any variations thereof are intended to cover non-exclusive inclusions, for example, a process, method, system, product, or device that includes a series of steps or units is not necessarily limited to those clearly listed steps or units, but may include other steps or units that are not clearly listed or inherent to such a process, method, product, or device.

A watermarking technology is a commonly used picture processing method. A watermark is added to an important picture, so that a source of the picture can be found through querying based on the watermark during spreading of the picture. This prevents a disseminator photographing or disseminating the picture at will, and serves as a deterrent and enables source tracing and finding of an accountable party.

Currently, there is also a similar requirement in the audio field. For example, in a remote audio and video conference, content from the conference may be leaked, resulting in disclosure of confidential commercial or personal information and causing an adverse effect. A main means thereof is as follows: A device such as a mobile phone or a recording pen secretly photographs or records the content from the conference on a side of a remote terminal, and sends the secretly recorded audio or video file to another person. Eventually, the file is spread on the internet, causing the adverse effect.

Currently, according to an audio watermark addition method, an watermarked audio is mainly obtained by processing audio offline in a later stage. However, in a scenario of live streaming a conference, an online real-time audio stream cannot be effectively processed.

For example, an application scenario of the methods provided in embodiments of this application is described.

Refer to FIG. 1. As shown in FIG. 1, a usage scenario of embodiments of this application may be a conference scenario. The scenario includes a venue A 101, a venue B 102, a venue C 103, and a media center 104 that schedules audio between the three venues. The venue A 101, the venue B 102, and the venue C 103 may be remote venues located in different places, respectively. In a specific work process, for example, a representative at the venue A 101 speaks. A recording device at the venue A 101 obtains speeches of the representative. Then, a communication device at the venue A 101 transmits a real-time audio stream to the media center 104. The media center 104 separately transmits the audio stream to the venue B 102 and the venue C 103. After communication devices at the venue B 102 and the venue C 103 obtain the audio streams, playback devices play the real-time audio from the venue A 101 in real time. In this way, a remote audio conference between the venue A 101, the venue B 102, and the venue C 103 is implemented.

In the work process, persons at the venue A, the venue B, and the venue C all may secretly record, disseminate, and disclose the audio played. Therefore, during source tracing and finding of an accountable party, a specific venue at which the audio is secretly recorded needs to be known.

To resolve the problem, an embodiment of this application provides an audio watermark addition method, to resolve a source tracing problem of audio by adding a watermark to audio that is played in real time.

With reference to the accompanying drawings, the following describes in detail the audio watermark addition method provided in this embodiment of this application. It should be noted that the application scenario is merely an example, and does not constitute a limitation on a usage scenario of this application. The method provided in this embodiment of this application may be further applied to other scenarios. This is not limited in this embodiment of this application.

Figure 2:
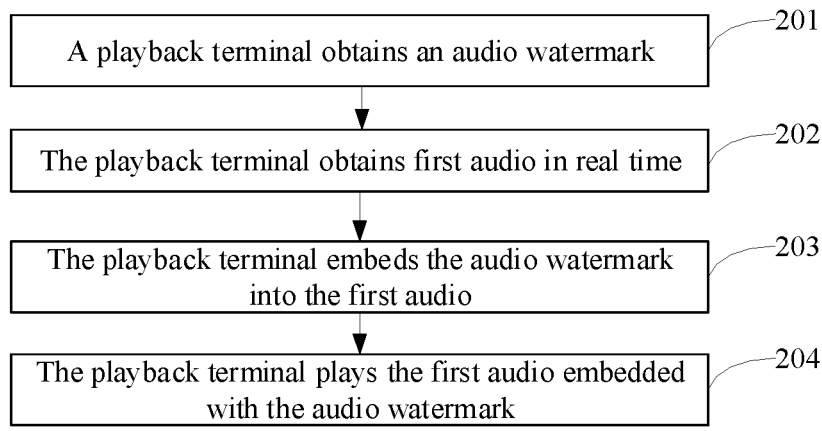
FIG. 2 is a schematic diagram of an embodiment of an audio watermark addition method according to an embodiment of this application.

Refer to FIG. 2. As shown in FIG. 2, the audio watermark addition method provided in this embodiment of this application includes the following steps.

201: A playback terminal obtains an audio watermark.

In this embodiment, the playback terminal obtains the audio watermark associated with the playback terminal. In a subsequent watermark parsing process, a parsing terminal can learn, based on the audio watermark, that the audio watermark is embedded into audio by the playback terminal.

Optionally, the audio watermark may be locally stored in the playback terminal in advance, or may be sent to the playback terminal by another device. For example, a service management center (SMC) separately sends, to a plurality of different playback terminals, their respective audio watermarks. For ease of description, an example in which the audio watermark is a number 14 is used for description in this embodiment. After obtaining the audio watermark "14" sent by the SMC, the current playback terminal stores the audio watermark locally. The number 14 is the audio watermark associated with the current playback terminal.

202: The playback terminal obtains first audio in real time.

In this embodiment, the first audio may be obtained by the playback terminal from the outside. For example, the playback terminal may be a playback terminal at the venue B in FIG. 1 or a playback terminal at the venue C in FIG. 1. The playback terminal obtains the first audio in real time from the media center. Optionally, in another application scenario, the first audio may be alternatively obtained in real time by the playback terminal from a memory of the playback terminal. This is not limited in this embodiment of this application.

203: The playback terminal embeds the audio watermark into the first audio.

In this embodiment, the audio watermark "14" of the playback terminal is associated with the playback terminal. Therefore, the playback terminal can be uniquely determined based on the audio watermark. In a specific work process, the playback terminal embeds the audio watermark into the first audio in real time when playing the first audio.

Optionally, this embodiment of this application further provides a specific work manner of embedding the audio watermark into the first audio. For ease of understanding, the following provides a detailed description with reference to an accompanying drawing.

Figure 3:
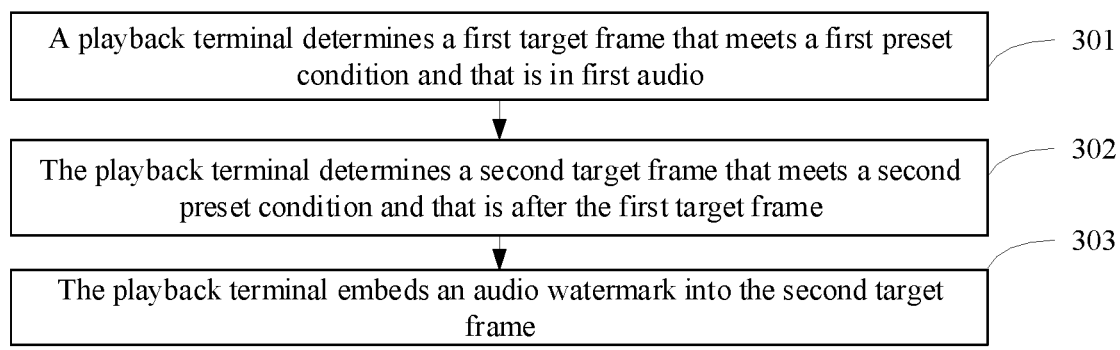
FIG. 3 is a schematic diagram of another embodiment of an audio watermark addition method according to an embodiment of this application.

Refer to FIG. 3. As shown in FIG. 3, a method for embedding the audio watermark into the first audio in the audio watermark addition method provided in this application includes the following steps.

301: The playback terminal determines a first target frame that meets a first preset condition and that is in the first audio.

In this embodiment, the first target frame serves as a marker. When performing parsing to obtain the audio watermark subsequently, the parsing terminal can learn, based on the first target frame, that there is the audio watermark after the first target frame. In this way, the audio watermark can be quickly located.

It should be noted that because the first target frame is added to the first audio in real time, it cannot be ensured that each frame in the first audio is suitable to be used as the first target frame. Therefore, a criterion for the first target frame needs to be determined. A target frame is used as the first target frame only when the target frame meets the first preset condition.

Optionally, a synchronization frame condition detector may be disposed in the playback terminal. The synchronization frame condition detector may be a physical apparatus disposed in the playback terminal, or may be operating logic stored in the playback terminal. The synchronization frame condition detector runs the method described in step 301 above, to determine the first target frame that meets the first preset condition.

It should be further noted that as described above, the first target frame meets the first preset condition. In a specific work process, the first preset condition varies with a sampling rate. The playback terminal determines, when a sampling rate of the first audio is greater than or equal to a first threshold, an audio frame with a maximum value of a low frequency portion in a first interval, as the first target frame. The playback terminal determines, when a sampling rate of the first audio is less than a first threshold, an audio frame including a first characteristic sound, as the first target frame. For ease of understanding, the following separately describes the two cases of the first preset condition in detail.

First case: When the sampling rate of the first audio is greater than or equal to the first threshold, the playback terminal determines the audio frame with the maximum value of the low frequency portion in the first interval, as the first target frame.

In this embodiment, when the sampling rate of the first audio is greater than or equal to the first threshold, the playback terminal identifies the first target frame by adding a synchronization frame marker to the first target frame. The synchronization frame marker is added by changing an energy value of an intermediate frequency portion of the first target frame. Therefore, it is required that low frequency energy of original audio of the first target frame is not excessively high or low. In actual application, low frequency energy of original audio is usually excessively low, resulting in a case that intermediate frequency energy is also excessively low relatively. Consequently, after recording is performed, a problem that the parsing terminal cannot obtain the synchronization frame marker through parsing occurs. In addition, when the low frequency energy of the original audio is excessively high, the intermediate frequency energy is also excessively high, resulting in a sonic boom. Therefore, the audio frame with the maximum value of the low frequency portion in the first interval needs to be determined as the first target frame.

The first interval may be specifically (Tlow, Thigh). When determining the first target frame, the playback terminal obtains a maximum energy value (Value) of a low frequency portion of the first audio, and determines whether the value meets a formula: Tlow<Value<Thigh. If the value meets the condition, the playback terminal determines a current target frame as the first target frame. Tlow is a lower energy value limit of the first interval. Thigh is an upper energy value limit of the first interval. Specific values of Tlow and Thigh may be specified based on an actual requirement by persons skilled in the art. For example, different threshold ranges, especially thresholds for excessively low energy, are set for different audio recording scenarios such as a conference room scenario, an auditorium scenario, and an open office area, to ensure that the synchronization frame marker can obtain good embedding intensity in the first target frame in different scenarios.

Further, after determining the first target frame in the foregoing manner, the playback terminal needs to add the synchronization frame marker to the target frame, so that the parsing terminal can determine the first target frame based on the synchronization frame marker subsequently. Adding the synchronization frame marker specifically includes the following steps.

1. The playback terminal obtains a first sampling point from the first target frame.

In this embodiment, the first sampling point is a sampling point in the intermediate frequency portion of the first target frame.

2. The playback terminal increases an energy value of the first sampling point, so that a ratio of the energy value of the first sampling point to an energy value of the low frequency portion is greater than or equal to a second threshold.

In this embodiment, the first sampling point is a sampling point in the intermediate frequency portion. After the energy value of the first sampling point is increased by the playback terminal, the energy value of the first sampling point differs significantly from an energy value of another sampling point in the low frequency portion. The ratio of the energy value of the first sampling point to the energy value of the low frequency portion is greater than or equal to the second threshold. Therefore, when obtaining the first target frame subsequently, the parsing terminal can perform parsing to obtain the synchronization frame marker based on the ratio of the energy value of the sampling point in the intermediate frequency portion to the energy value of the sampling point in the low frequency portion.

For ease of understanding, based on an idea described in steps 1 and 2 above, the following provides a more specific implementation of adding the synchronization frame marker.

(1) Perform fast Fourier transformation (FFT) on an audio signal of the first target frame, obtain a low frequency portion of the audio signal, find a maximum energy value $max_1$, and calculate a reference coefficient $$\max\_E_1 = \frac{\max_1}{5}$$

used for modifying an energy value of a synchronization signal.

Figure 4:
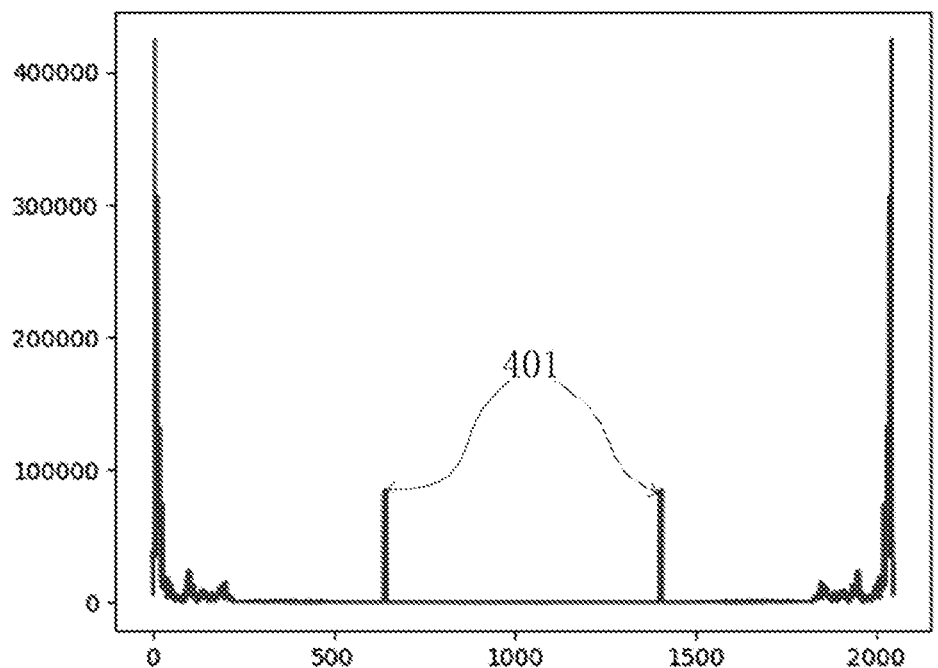
FIG. 4 is a schematic diagram of another embodiment of an audio watermark addition method according to an embodiment of this application.

In this embodiment, as shown in FIG. 4, after fast Fourier transformation is performed on the audio signal of the first target frame, a line graph of the audio signal of the first target frame in frequency domain and time domain is obtained. Based on FIG. 4, the maximum energy value of the low frequency portion can be learned of.

(2) Obtain eight energy values $E(i)_1$ in an intermediate frequency portion, where $0 \leq i < 8$; calculate a maximum value $max'_1$ of the eight points; and then modify $E(i)'_1$ according to $$E(i)'_1 = \frac{E(i) * \max\_E_1}{\max'_1}.$$

In this embodiment, as shown in FIG. 4, after the modification, an energy value of a second sampling point 401 in the intermediate frequency portion is significantly increased. This is because the maximum energy value $max\_E_1$ of the low frequency portion is added to the formula for modifying an energy value $E(i)'$ of the intermediate frequency portion. Therefore, the energy value of the first sampling point in the intermediate frequency portion is significantly increased relative to the energy value of the low frequency portion. It should be noted that obtaining eight energy values described above is merely a preferable example. Persons skilled in the art may select different quantities of energy values based on an actual requirement. This is not limited in this embodiment of this application.

(3) Obtain points that are symmetrical with the foregoing eight energy points in the intermediate frequency portion, and perform a same operation of increasing an energy value.

In this embodiment, energy distribution presented after Fourier transformation is performed is symmetric. Therefore, eight points are obtained from a portion that is symmetrical with the foregoing eight points, and a same embedding operation is performed.

(4) Perform inverse fast Fourier transformation (IFFT) on a frequency domain signal.

In this embodiment, after fast Fourier transformation is performed, the energy value of the intermediate frequency portion of the first target frame is modified in the foregoing manner. Then, inverse fast Fourier transformation is performed on the first target frame. In this way, a time domain signal embedded with the synchronization frame marker is obtained. The time domain signal is the first target frame embedded with the synchronization frame marker.

In this embodiment, in a manner described in steps (1) to (4) above, the energy value of the first sampling point in the intermediate frequency portion of the first target frame is increased, so that a ratio of the energy value of the first sampling point to the energy value of the low frequency portion exceeds a preset range. In this way, in a subsequent parsing process, when obtaining a target frame with a ratio of an energy value of a sampling point in an intermediate frequency portion to an energy value of a low frequency portion greater than a preset value, the parsing terminal can determine that the target frame is the first target frame to which the synchronization frame marker is added. Thus, the synchronization frame marker is added to the first target frame.

In this embodiment, the playback terminal determines in real time a target frame that meets the first preset condition and that is in the first audio, as the first target frame, and then increases the energy value of the first sampling point in the intermediate frequency portion of the first target frame, so that the ratio of the energy value of the first sampling point to the energy value of the low frequency portion is greater than or equal to a preset ratio, implementing addition of the synchronization frame marker. Therefore, when the sampling rate of the first audio is greater than or equal to the first threshold, the playback terminal determines the audio frame with the maximum value of the low frequency portion in the first interval, as the first target frame.

It should be noted that for audio with a sampling rate less than a preset value, the embedded synchronization frame marker affects experience of a human ear listening to the first audio. This is because the energy value of the intermediate frequency portion is increased in the manner of adding the synchronization frame marker. Therefore, when the sampling rate of the first audio is less than the first threshold, the first target frame can no longer be located by using the synchronization frame marker. To resolve the problem, this embodiment of this application provides a second solution.

Second case: When the sampling rate of the first audio is less than the first threshold, the playback terminal determines the audio frame including the first characteristic sound, as the first target frame.

The playback terminal determines the audio frame including the first characteristic sound, as the first target frame. A specific method is as follows.

When the first characteristic sound is detected and duration of the first characteristic sound is greater than or equal to preset duration, the playback terminal determines the audio frame including the first characteristic sound, as the first target frame.

In this embodiment, the first characteristic sound may be detected by using a sound detection method. A manner of detecting a characteristic sound may be any manner in the conventional technology. This is not limited in this embodiment of this application. In a specific work process, the first characteristic sound may be a human voice. For example, after it is detected that a period without a human voice is greater than a preset period, a frame corresponding to a moment at which a human voice is detected again is used as the first target frame. An advantage of this manner is that this manner can be applied to a conference scenario. In the conference scenario, people communicate through speeches. To prevent speeches from being trans-recorded, an audio watermark needs to be added to audio in which the speeches are recorded. In the manner of detecting a human voice, when it is detected that a period during which there is no human voice is greater than a preset period (e.g., 1.5s), a frame corresponding to a moment at which a human voice is detected again is used as the first target frame. In this way, it is ensured that the watermark can be subsequently embedded into audio in which speech information is recorded.

Optionally, the first characteristic sound may be further determined in a more detailed manner. For example, when a particular speech is detected in a state in which human voice detection is enabled, a target frame in which the particular speech is located is determined as the first target frame.

In this embodiment, when the sampling rate of the first audio is less than the first threshold, the playback terminal determines the first target frame by determining the first characteristic sound. In this way, a starting position (that is, the first target frame) in which the watermark is embedded is determined by using the characteristic sound, with no need to embed the synchronization frame marker. Therefore, it is ensured that the first target frame that marks the position in which the watermark is embedded can be found in the first audio, regardless of whether the sampling rate of the first audio is greater than or less than the first threshold.

Optionally, the two manners in the first case and the second case may be implemented by a synchronization frame embedder in the playback terminal. The synchronization frame embedder may be a physical apparatus disposed in the playback terminal, or may be operating logic stored in the playback terminal. This is not limited in this embodiment of this application.

In the foregoing manner, the playback terminal determines the first target frame in the first audio. In this case, the playback terminal needs to perform a subsequent step to embed the audio watermark after the first target frame.

302: The playback terminal determines a second target frame that meets a second preset condition and that is after the first target frame.

In this embodiment, the second target frame is a target frame that is after the first target frame. Because the second target frame is determined in real time, it cannot be ensured that each frame that is after the first target frame and that is in the first audio is suitable to be used as the second target frame. Therefore, a criterion for the second target frame needs to be determined. A target frame is used as the second target frame only when the target frame meets the second preset condition.

It should be noted that in an actual work process, the playback terminal periodically determines the first target frame and the second target frame in the first audio. First, because the playback terminal needs to add the audio watermark to the first audio in real time, the playback terminal can process the first audio only in an order of playback time. In a processing process, the playback terminal first determines the first target frame based on the first preset condition, and then determines the second target frame that meets the second preset condition and that is after the first target frame. In this case, the first target frame and the second target frame form an audio watermark cycle. In a next audio watermark cycle, the playback terminal still first determines the first target frame based on the first preset condition, and then determines the second target frame that meets the second preset condition and that is after the first target frame. A result of such processing is that the first audio includes a plurality of first target frames, and one second target frame is included between every two adjacent first target frames in the first audio.

Therefore, in an optional technical solution, the playback terminal may alternatively first determine the first target frame and then determine the second target frame in a process of adding the watermark to the first audio. A result thereof may still be that one second target frame is included between every two adjacent first target frames in the first audio. Therefore, persons skilled in the art may determine, based on an actual requirement, an order of determining the first target frame and the second target frame. This is not limited in this embodiment of this application. For ease of understanding, only that the second target frame is after the first target frame is used for description in this embodiment of this application.

Further, a specific implementation of the determining a second target frame that meets a second preset condition may be as follows: the playback terminal determines a target frame with an energy value of an intermediate frequency portion greater than or equal to a third threshold and less than a fourth threshold, as the second target frame.

In this embodiment, the watermark is embedded into an intermediate frequency area of the second target frame. If energy of the intermediate frequency area is excessively low, erroneous parsing easily occurs or the watermark cannot be detected after the watermark is embedded. If energy of the intermediate frequency area is excessively high, a sonic boom occurs after the watermark is embedded. Further, consecutive embedded watermarks may interfere with each other. Therefore, when the second target frame is determined, it may be further ensured that there is a sufficient interval between second target frames in a plurality of cycles. Further, the interval between the third target frames needs to be greater than or equal to a sixth threshold. A specific value of the sixth threshold may be set by persons skilled in the art based on an actual situation. This is not limited in this embodiment of this application.

It should be noted that the energy value of the intermediate frequency portion of the second target frame is greater than or equal to the third threshold and less than the fourth threshold, and the third threshold is less than the fourth threshold. Specific values of the third threshold and the fourth threshold may be determined by persons skilled in the art based on an actual requirement. This is not limited in this embodiment of this application.

303: The playback terminal embeds the audio watermark into the second target frame.

In this embodiment, the second target frame is a target frame that is after the first target frame. In a plurality of watermark cycles of the first audio, the second target frame is between two first target frames. The audio watermark is embedded into the second target frame, so that in the subsequent watermark parsing process, the parsing terminal can determine a position of the second target frame based on the first target frame, and find the audio watermark.

Figure 5A:
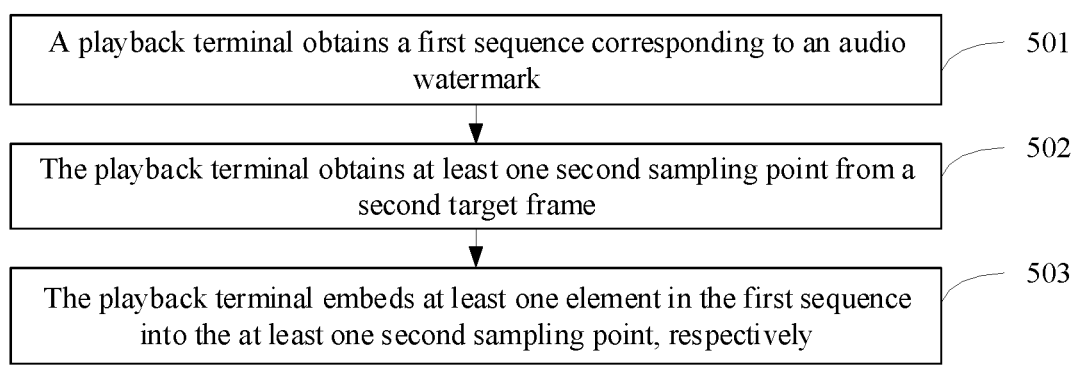
FIG. 5a is a schematic diagram of another embodiment of an audio watermark addition method according to an embodiment of this application.

Further, this embodiment of this application further provides a specific implementation of the playback terminal embedding the audio watermark into the second target frame. For ease of understanding, the following describes the case in detail with reference to FIG. 5a. As shown in FIG. 5a, embedding the audio watermark includes the following steps.

501: The playback terminal obtains a first sequence corresponding to the audio watermark.

In this embodiment, optionally, the audio watermark may be presented in a form of a sequence. For example, the playback terminal is the playback terminal at the venue B. As described in the example in step 201 above, an identifier of the playback terminal is "14". In this case, the first sequence corresponding to the audio watermark is "14". In a subsequent step, the sequence 14 needs to be embedded into the first audio as the audio watermark. In this way, the playback terminal associated with the audio watermark is marked in the first audio.

502: The playback terminal obtains at least one second sampling point from the second target frame.

In this embodiment, one target frame includes 2048 sampling points. The playback terminal obtains at least one second sampling point from the second target frame. In a subsequent work process, an element in the first sequence is embedded into the second sampling point.

503: The playback terminal embeds at least one element in the first sequence into the at least one second sampling point, respectively.

In this embodiment, the playback terminal embeds an element in the first sequence into the second sampling point. One element in the first sequence is embedded into one second sampling point. In this way, the second sampling point records content of the first sequence. Subsequently, by reading the first sequence recorded in the second sampling point, the parsing terminal can obtain, through parsing, content recorded in the audio watermark.

It should be noted that the step that the playback terminal embeds at least one element in the first sequence into the at least one second sampling point, respectively may be performed in the following manner:

the playback terminal adjusts an energy ratio of energy values of different portions of the second sampling point in time domain and/or frequency domain.

In this embodiment, a value of the energy ratio is associated with a digit in the first sequence. Different energy ratios may correspond to different digits. In this way, different digits in the first sequence are recorded by using different energy ratios. Further, the content of the first sequence is recorded in the second sampling point by changing an energy ratio, implementing embedding of the audio watermark.

For example, the audio watermark that the playback terminal needs to embed is a number "14". When the audio watermark is embedded into the first audio, the audio watermark needs to be converted into a binary number. In this case, the number "14" is converted into a binary number, and a first sequence "1110" is obtained. The first sequence is content that needs to be embedded into the first audio as the audio watermark. The first sequence includes four elements: 1, 1, 1, and 0. The four elements are embedded into four second sampling points in the second target frame, respectively. In this way, the audio watermark is embedded.

In a specific work process, each element in the first sequence is embedded into a second sampling point by changing an energy ratio of the second sampling point. The energy ratio of the second sampling point may be changed by using the following three different solutions: A first solution: changing a ratio of energy values of different portions in time domain; a second solution: changing a ratio of energy values of different portions in frequency domain; and a third solution: changing both a ratio of energy values of different portions in time domain and a ratio of energy values of different portions in frequency domain. For ease of understanding, the following describes the three manners in detail with reference to the accompanying drawings.

First solution: changing a ratio of energy values of different portions in time domain.

In this embodiment, a manner of implementing embedding in time domain by changing a ratio of energy values of different portions in time domain includes the following steps.

1. Decrease an energy value of a first half of a second sub-sampling point, so that a ratio of an energy value of a second half to the energy value of the first half of the second sampling point is greater than or equal to a fifth threshold.

Figure 5B:
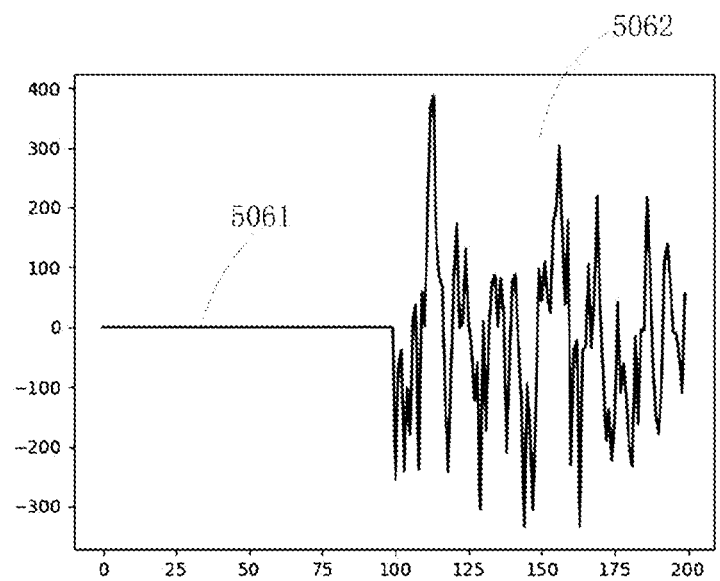
FIG. 5b is a schematic diagram of another implementation of an audio watermark addition method according to an embodiment of this application.

In this embodiment, as shown in FIG. 5b, in the second sampling point, the energy value of the first half 5061 of the second sampling point is decreased in an order in time domain, so that the energy value of the second half 5062 of the second sampling point is significantly greater than the energy value of the first half 5061. In this case, a waveform with such energy distribution may be preset as a digit 0.

Specifically, the waveform may be implemented in the following manner.

Figure 5C:
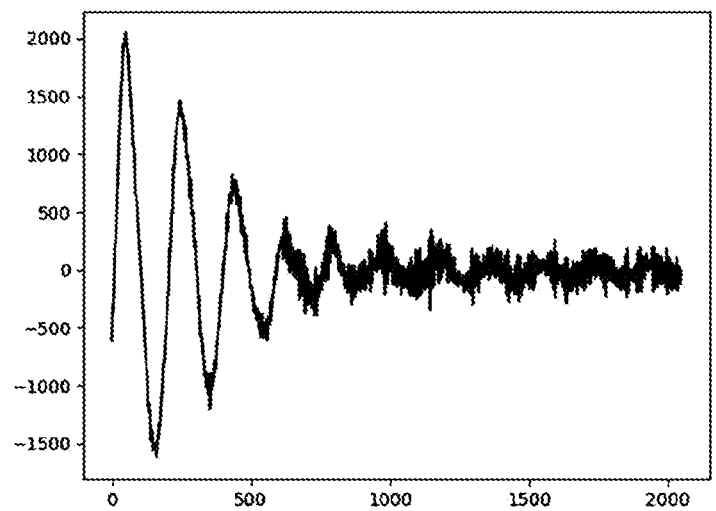
FIG. 5c is a schematic diagram of another implementation of an audio watermark addition method according to an embodiment of this application.
Figure 5D:
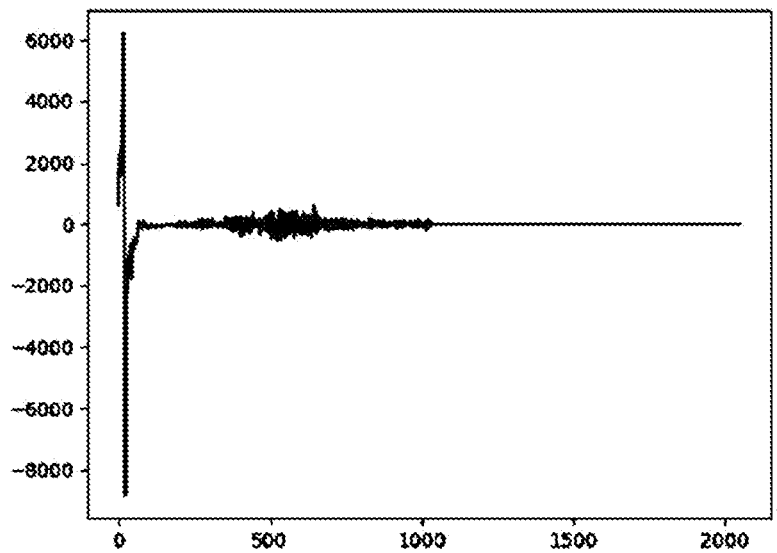
FIG. 5d is a schematic diagram of another implementation of an audio watermark addition method according to an embodiment of this application.
Figure 5E:
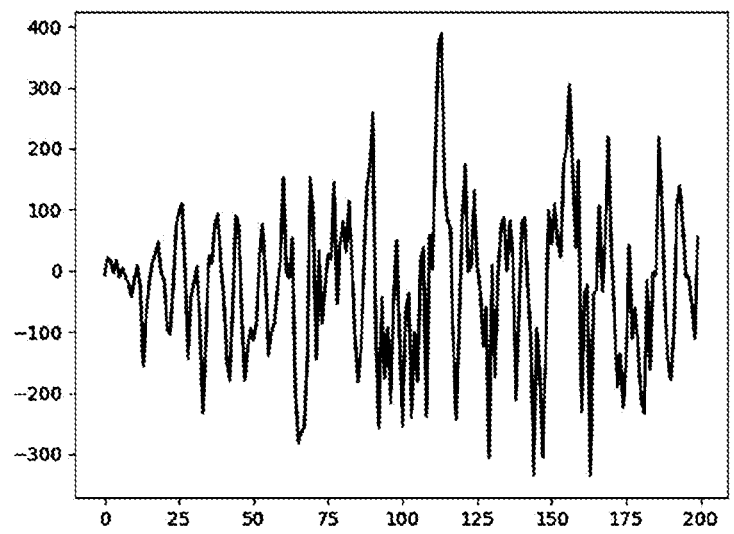
FIG. 5e is a schematic diagram of another implementation of an audio watermark addition method according to an embodiment of this application.

As shown in FIG. 5c, FIG. 5c is an original waveform diagram of a frame in which the second sampling point is located. First discrete cosine transformation DCT is performed on the original waveform shown in FIG. 5c, to obtain a waveform diagram shown in FIG. 5d. Then, an intermediate frequency portion is selected from the waveform diagram shown in FIG. 5d, and second DC transformation is performed on the intermediate frequency portion, to obtain a waveform diagram shown in FIG. 5e. In this case, energy of a waveform shown in FIG. 5e is processed according to the following formula 1.

$$P'(j) = \frac{P(j)}{\lambda}, \quad \text{(formula 1)}$$
$$1 \le j \le \text{mid}$$

In the formula 1, j is a time period in time domain; P(j) is total energy of the waveform in FIG. 5e in the time period j; λ, is a preset coefficient, where a specific value of λ, may be adjusted based on an actual requirement; and mid represents a midpoint of the waveform in FIG. 5e in time domain. It can be learned from the formula that a value range of j is from 1 to the midpoint, that is, a first half in FIG. 5e. The total energy value P(j) of the first half is divided by the coefficient λ, reducing the energy value of the first half of the second sampling point. In this way, a waveform diagram shown in FIG. 5b is obtained.

2. Decrease an energy value of a second half of a second sub-sampling point, so that a ratio of an energy value of a first half to the energy value of the second half of the second sampling point is greater than or equal to a fifth threshold.

Figure 5F:
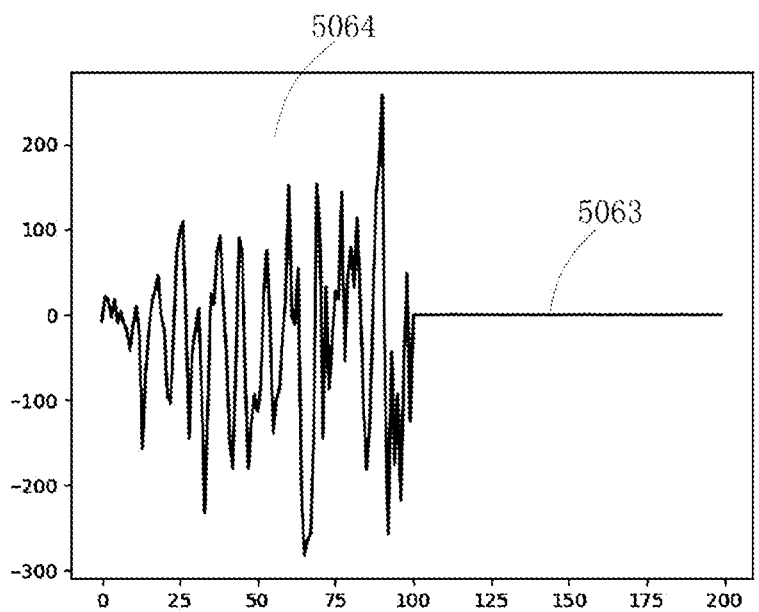
FIG. 5f is a schematic diagram of another implementation of an audio watermark addition method according to an embodiment of this application.

In this embodiment, as shown in FIG. 5f, in the second sampling point, the energy value of the second half 5063 of the second sampling point is decreased in an order in time domain, so that the energy value of the first half 5064 of the second sampling point is significantly greater than the energy value of the second half 5063. In this case, a waveform with such energy distribution may be preset as a digit 1.

Specifically, the waveform may be implemented in the following manner.

Based on the waveform diagram shown in FIG. 5e above, in this case, energy of a waveform shown in FIG. 5e is processed according to the following formula 2.

$$P'(j) = \frac{P(j)}{\lambda}, \quad \text{(formula 2)}$$
$$\text{mid} + 1 \le 1 \le S' - T'$$

In the formula 2, j is a time period in time domain; P(j) is total energy of the waveform in FIG. 5e in the time period j; λ, is a preset coefficient, where a specific value of λ, may be adjusted based on an actual requirement; mid represents a midpoint of the waveform in FIG. 5e in time domain; and S'-T' represents an upper limit in time domain in FIG. 5e. It can be learned from the formula that a value range of j is from mid+1 to S'-T' (that is, from the midpoint in time domain to an endpoint in time domain), that is, a second half in FIG. 5e. The total energy value P(j) of the second half is divided by the coefficient λ, reducing the energy value of the second half of the second sampling point. In this way, a waveform diagram shown in FIG. 5f is obtained.

In this embodiment, a watermark is embedded by changing a ratio of energy values of different portions of the second sampling point in time domain. Specifically, the energy ratios of the first half and the second half of the second sampling point in time domain are adjusted, and then, the different energy ratios of the first half and the second half are preset as 0 and 1, respectively. In this way, embedding of binary digits at the second sampling point is implemented. Subsequently, the binary sequence may be converted into a decimal sequence based on a requirement, implementing a work process of adding the first sequence to the second sampling point. When performing parsing to obtain the audio watermark subsequently, the parsing terminal directly obtains a ratio of energy values of a first half and a second half of a target frame, thus obtaining the audio watermark through parsing.

It should be noted that in the parsing process, the energy ratio is determined with a midpoint of the target frame in time domain as a boundary. After the ratio of the first half and the second half is obtained, parsing is performed according to the preset rules. However, in an actual work process, when the first audio is trans-recorded, a high-energy portion increases in time domain due to a factor such as an echo or a reverberation at a venue. For example, when the audio watermark is 1, the midpoint in time domain is used as a boundary, and the ratio of the energy value of the first half to the energy value of the second half is greater than or equal to the fifth preset value. However, due to presence of an echo or a reverberation during trans-recording, the high-energy area crosses the midpoint in time domain. This affects a value of the energy ratio, and results in a case that the parsing terminal cannot obtain the watermark based on the energy ratio. To resolve the problem, this embodiment of this application further provides a method for changing an energy ratio in frequency domain, to overcome an impact caused by an echo or a reverberation occurred during trans-recording on energy distribution in time domain.

Second solution: changing a ratio of energy values of different portions in frequency domain.

In this embodiment, an energy ratio of a second sampling point in frequency domain is changed in a manner similar to the foregoing manner, to implement embedding of a watermark. For a specific implementation, refer to the method for changing an energy ratio of different portions in time domain. A difference lies in that in this implementation, a frequency in frequency domain is used as a boundary, instead of using a time in time domain as a boundary.

Figure 5G:
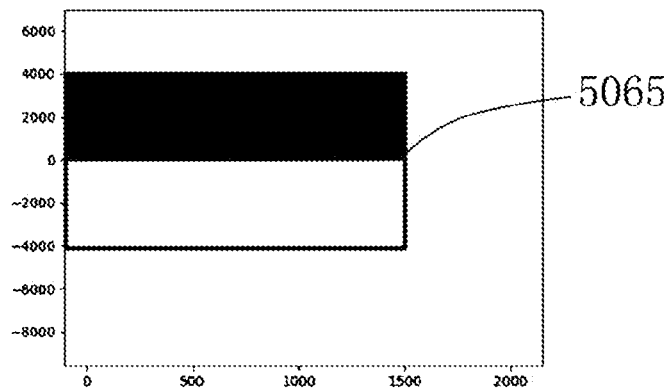
FIG. 5g is a schematic diagram of another implementation of an audio watermark addition method according to an embodiment of this application.
Figure 5G:
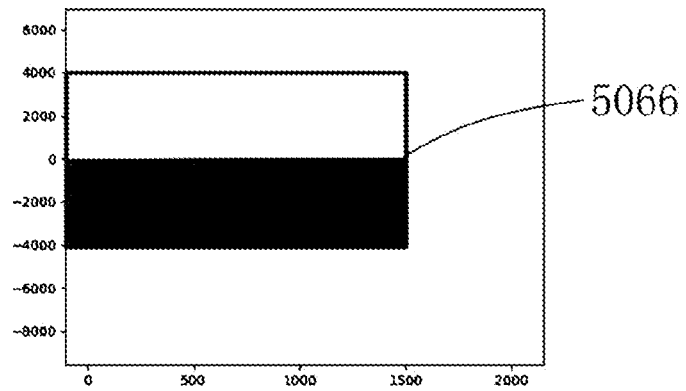

Energy distribution diagrams obtained by changing an energy ratio of different portions in frequency domain are shown in FIG. 5g. It should be noted that the diagrams shown in FIG. 5b to FIG. 5f above are line graphs illustrating correspondences between energy values and time domain, whereas the energy distribution diagrams shown in FIG. 5g display relationships between energy distribution in time domain and energy distribution in frequency domain. In an energy distribution box in FIG. 5g, a shadow portion represents a high-energy portion, and a white portion represents a low-energy portion. In the second sampling point, a midpoint in frequency domain is used as a boundary. Energy distribution 5065 with a ratio of an upper half to a lower half greater than a fifth threshold represents a digit 1. Energy distribution 5066 with a ratio of a lower half to an upper half greater than a fifth threshold represents a digit 0. In this way, an audio watermark is embedded by changing an energy ratio in frequency domain, and an impact caused by an echo or a reverberation occurred during trans-recording on energy distribution in time domain is overcome.

Third solution: changing both a ratio of energy values of different portions in time domain and a ratio of energy values of different portions in frequency domain.

Figure 5H:
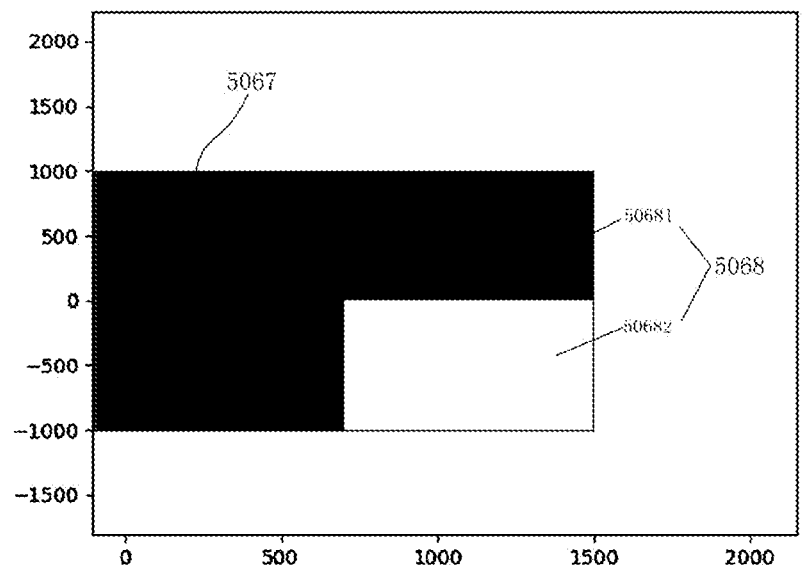
FIG. 5h is a schematic diagram of another implementation of an audio watermark addition method according to an embodiment of this application.

In this embodiment, the first solution and the second solution are combined. First, by using a method in the first solution, an energy ratio of a first half and a second half of a second sampling point in time domain is adjusted, to implement a first step of watermark embedding. As shown in FIG. 5h, when a ratio of an energy value of a first half 5067 to an energy value of a second half 5068 of a second sampling point is greater than a fifth threshold, an audio watermark of a digit 1 is embedded. Further, to prevent an echo or a reverberation occurred during trans-recording from affecting energy distribution of an audio watermark in time domain, as shown in FIG. 5h, the method in the second solution is used for the second half (that is, a low-energy portion) in FIG. 5h, and an energy ratio of a high frequency portion 50681 to a low frequency portion 50682 is changed. Energy distribution with a ratio of an upper half to a lower half of the second sampling point greater than the fifth threshold also represents the digit 1.

Likewise, after the ratios of energy distribution are exchanged, a digit 0 can be represented.

In a manner provided in the third solution, a large watermark and a small watermark are simultaneously added to the second sampling point. The large watermark and the small watermark separately record the same digit. The large watermark is a watermark obtained by changing the energy ratio of the first half and the second half of the second sampling point in time domain, that is, a watermark formed by changing the energy ratio of the first half 5067 to the second half 5068 of the second sampling point in FIG. 5h. The small watermark is a watermark obtained by changing the energy ratio of the high frequency portion and the low frequency portion of the low-energy portion of the second sampling point, that is, a watermark formed by changing the energy ratio of the high frequency portion 50681 to the low frequency portion 50682 of the second half 5068 in FIG. 5h.

Figure 5I:
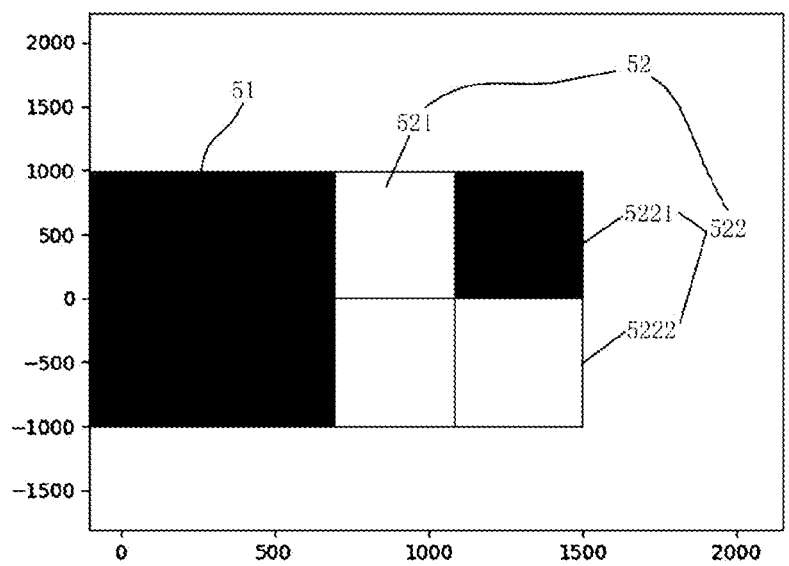
FIG. 5i is a schematic diagram of another implementation of an audio watermark addition method according to an embodiment of this application.

Further, for the watermarks shown in FIG. 5h, to prevent an echo or a reverberation occurred during trans-recording from affecting energy distribution in time domain, the low-energy portion of the audio watermark may be further divided. An energy distribution diagram shown in FIG. 5i is used to represent digits 1. A shadow portion represents a high-energy portion, and a white portion represents a low-energy portion. As shown in FIG. 5i, in time domain, a first half 51 is a high-energy portion, and a second half 52 is a low-energy portion. When a small watermark is embedded into the second half 52, the second half 52 is further divided into two portions in time domain, respectively denoted as a first portion 521 and a second portion 522. The first portion 521 is an area close to the first half 51 (the high-energy portion), and the second portion 522 is an area away from the first half 51 (the high-energy portion). When the small watermark is embedded, only an energy ratio of a high frequency portion to a low frequency portion of the second portion 522 is changed. For the first portion 521, because the first portion 521 is close to the high-energy portion, a reverberation occurred during trans-recording may result in a case that energy of the first portion 521 increases accordingly. Therefore, an energy ratio of a high frequency portion and a low frequency portion of the first portion 521 is no longer changed, eliminating an impact caused by an echo or a reverberation occurred during trans-recording on energy distribution in time domain. The small watermark is only embedded, by changing an energy ratio of a high frequency portion and a low frequency portion, into the second portion 522 that is away from the high-energy portion. An energy value of the high frequency portion 5221 is greater than an energy value of the low frequency portion 5222 of the second portion 522, and the digit 1 is also represented. A large watermark and the small watermark separately represent a same audio watermark.

Likewise, after the high-energy portion and the low-energy portion in FIG. 5i are exchanged, an audio watermark representing a digit 0 can be obtained.

It should be noted that for the audio watermarks shown in FIG. 5i above, the low-energy portion (that is, the second half 52) is divided into two portions (the first portion 521 and the second portion 522) in time domain for processing. In an actual work process, persons skilled in the art may divide the low-energy portion into more portions in time domain based on an actual requirement. This is not limited in this embodiment of this application.

In this embodiment, to embed the audio watermark into the first audio in real time, the playback terminal searches, in a time sequence, frames that are after the first target frame for the second target frame that meets the preset condition, and embeds the audio watermark into the second target frame. In a process of embedding the audio watermark, the audio watermark is embedded by changing an energy ratio of energy values of different portions of a sampling point in the third target frame in time domain and/or frequency domain, implementing real-time embedding of the audio watermark. In addition, the embedded watermark has a strong anti-interference capability when the audio is trans-recorded.

It should be noted that in the first solution to the third solution, the playback terminal embeds a binary watermark by changing an energy ratio. In an actual work process, based on an actual requirement, persons skilled in the art may implement embedding of a watermark that is in another number system, for example, a decimal system or a duo-decimal system, by changing an energy ratio. This is not limited in this embodiment of this application.

It should be noted that in the first sequence, to help determine, during parsing, integrity of the watermark embedded into the first audio, the playback terminal needs to add a check bit to the first sequence when embedding the audio watermark into the first audio, so that the parsing terminal can determine transmission integrity of the audio watermark based on the check bit subsequently. This prevents a parsing failure that occurs in a case in which when the first audio is trans-recorded, the audio watermark is incompletely transmitted due to loss of a trans-recorded signal. For ease of understanding, the following describes in detail a specific manner of adding a check bit.

In this embodiment, as described above, the audio watermark obtained by the playback terminal is the number "14". When the audio watermark is embedded into the first audio, the audio watermark needs to be converted into a binary number. In this case, the number "14" is converted into a binary number, and the first sequence "1110" is obtained. The first sequence is content that needs to be embedded into the first audio as the audio watermark. To ensure transmission integrity of the first sequence, a check bit may be added to the first sequence. For example, a parity check manner may be used. For example, the first sequence "1110" includes three digits 1, that is, an odd quantity of digits "1". In this case, a digit 1 is added to a last bit of the first sequence, and a new first sequence is "11101" obtained. 1 in a last bit of the first sequence is a check bit. "1" in the check bit is used to indicate that the current sequence has an odd quantity of digits "1" except the check bit. Likewise, if the first sequence includes an even quantity of digits "1", the check bit is "0". In this way, a quantity of bits of the first sequence is determined. Subsequently, the parsing terminal can verify the first sequence based on the check bit, ensuring accurate transmission of the first sequence.

Further, there is a problem that some sampling points are lost when the first audio is recorded through air. When the first sequence in the audio watermark is excessively long, the audio watermark occupies an excessively large quantity of frames. During detection, due to loss of sampling points, a starting position of each frame deviates from an expected bit, resulting in inaccurate detection of the audio watermark. To resolve the problem, after a length of the first sequence exceeds a threshold, the first sequence is divided into a plurality of subsequences. A check bit is added to each subsequence in the foregoing manner separately, and then the subsequences are combined to form a large first sequence. In this way, when performing parsing to obtain the audio watermark subsequently, the parsing terminal can verify the first sequence based on preset sub-cycles separately. As such, transmission integrity of the first sequence is ensured.

In this embodiment, for example, the audio watermark is the number "14". After the check bit is added, the first sequence corresponding to the audio watermark is "11101". The playback terminal obtains a first second target frame, and embeds a first element "1" in the first sequence into a first second sampling point in the second target frame in the manner described in step 503 above, implementing embedding of a first digit in the first sequence. In this way, a first sub-cycle of a watermark embedding cycle is completed. Then, step 503 above is performed cyclically. The playback terminal obtains a second second sampling point from the second target frame, and embeds a second element "1" in the first sequence into the second second sampling point in the second target frame in the same manner, implementing embedding of a second digit in the first sequence; and so on. By analogy, the playback terminal embeds five digits in the first sequence into five second sampling points in the second target frame in the complete watermark embedding cycle that includes five watermark embedding sub-cycles.

Optionally, in each watermark embedding sub-cycle, to ensure that watermark embedding intensity in the current sub-cycle is sufficient, the playback terminal needs to detect embedding intensity once after each sub-cycle is completed.

It should be noted that a specific manner of detecting watermark embedding intensity is as follows: detecting whether an energy ratio of energy values of different portions of a second sampling point in time domain and/or frequency domain in a current sub-cycle is greater than the fifth threshold. The first watermark embedding solution in step 503 above is used as an example. It is assumed that a digit embedded into a current second sampling point is 1. In this case, the playback terminal needs to determine whether an energy ratio of a first half to a second half of the current second sampling point in time domain is greater than the fifth threshold. If the energy ratio is greater than the fifth threshold, the playback terminal performs a subsequent step. If the energy ratio is not greater than the fifth threshold, the playback terminal performs watermark embedding again. In this case, a value of λ, in the formula 1 is increased, to further decrease an energy value of the second half of the second sampling point. In this way, the energy ratio of the first half to the second half of the second sampling point in time domain is increased, so that watermark embedding intensity meets a requirement.

In this embodiment, in a manner described in steps 501 to 503 above, the playback terminal embeds the audio watermark into the second target frame. At this point, step 203 is completed.

204: The playback terminal plays the first audio embedded with the audio watermark.

In this embodiment, the playback terminal plays the first audio embedded with the audio watermark. Because the audio watermark is embedded into the first audio in real time, the audio played by the playback terminal can still have the audio watermark in a real-time playback scenario. Therefore, when the first audio is trans-recorded subsequently, source tracing can be performed for the first audio based on the audio watermark.

In conclusion, in the audio watermark addition method provided in this embodiment of this application, the playback terminal obtains the first audio in real time; the playback terminal embeds the audio watermark into the first audio, where the audio watermark is associated with the playback terminal; and the playback terminal plays the first audio embedded with the audio watermark. In this way, in a scenario of playing audio in real time, the playback terminal adds the audio watermark to an audio stream in real time, so that a device can determine the playback terminal based on the audio watermark when performing watermark parsing in a later stage, facilitating source tracing after the first audio is trans-recorded.

For the first audio to which the audio watermark is added by using the audio watermark addition method, regardless of whether the first audio is trans-recorded through a digital channel or an air channel, the parsing terminal can parse the first audio obtained through trans-recording to obtain the audio watermark. In this way, source tracing is implemented for the first audio. The parsing terminal can determine, based on the audio watermark, the playback terminal that adds the audio watermark to the first audio. For ease of understanding, the following describes in detail an audio watermark parsing method provided in an embodiment of this application, with reference to the accompanying drawings.

Figure 6:
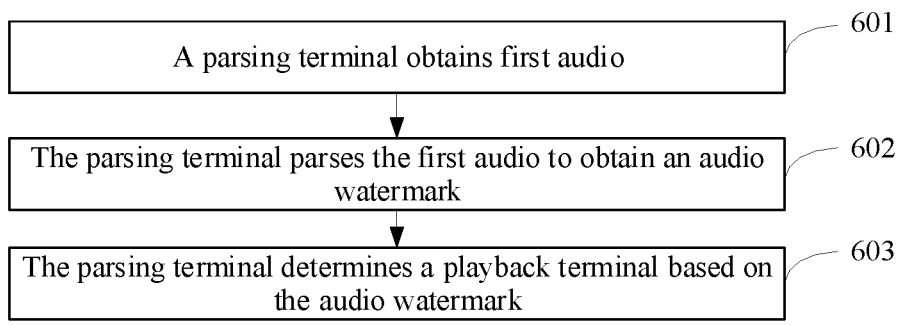
FIG. 6 is a schematic diagram of an embodiment of an audio watermark parsing method according to an embodiment of this application.

Refer to FIG. 6. As shown in FIG. 6, the audio watermark parsing method provided in this embodiment of this application includes the following steps.

601: A parsing terminal obtains first audio.

In this embodiment, the first audio is audio into which a playback terminal embeds an audio watermark by using the foregoing method. It should be noted that an initial playback source of the first audio is the playback terminal. That is, the playback terminal embeds the audio watermark into the first audio. After the playback terminal plays the first audio, the first audio is directly obtained by the parsing terminal, or may be trans-recorded. Trans-recording may be propagation trans-recording performed through a digital channel, or may be trans-recording performed through an air channel. Audio obtained through trans-recording performed in these two manners can be parsed by using the method provided in this application.

Optionally, after obtaining the first audio, the parsing terminal further needs to convert a format and a sampling rate of the first audio.

In this embodiment, there is a variety of recording devices that trans-record the first audio. In particular, recorded audio files of different brands of recording devices are not in a same format, and a sampling rate of the recorded audio files is usually 44.1 k. Therefore, after the playback terminal plays the first audio, an audio file format and a sampling rate need to be converted first, to obtain a format and a sampling rate that can be processed by the parsing terminal. Preferably, the parsing terminal may convert the sampling rate of the first audio into 48 k.

602: The parsing terminal parses the first audio to obtain the audio watermark.

In this embodiment, the parsing terminal may parse the first audio in real time or offline. This is not limited in this embodiment of this application. For ease of understanding, an offline parsing method is mainly described in this embodiment of this application, but this does not constitute a limitation on this solution.

Figure 7:
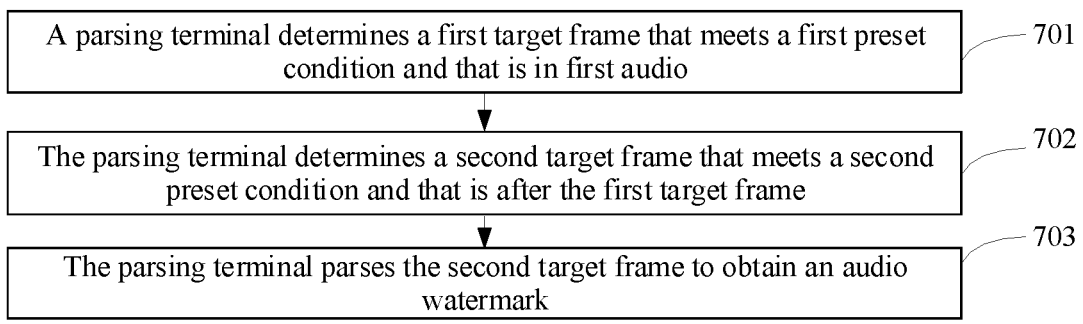
FIG. 7 is a schematic diagram of another embodiment of an audio watermark parsing method according to an embodiment of this application.

Refer to FIG. 7. As shown in FIG. 7, the parsing the first audio to obtain the audio watermark in the audio watermark parsing method provided in this application includes the following steps.

701: The parsing terminal determines a first target frame that meets a first preset condition and that is in the first audio.

In this embodiment, the first target frame meets the first preset condition. Therefore, the parsing terminal may obtain the first target frame in the first audio based on the first preset condition. It should be noted that the first audio includes a plurality of first target frames, and each first target frame corresponds to one watermark parsing cycle. Therefore, each time the parsing terminal determines a first target frame that meets the first preset condition and that is in the first audio, the parsing terminal performs a subsequent parsing step. The first preset condition may be: using a target frame with a maximum value of a low frequency portion in a first interval, as the first target frame. For a specific implementation of the first interval, refer to a description in step 301 above. Details are not described herein again.

It should be noted that the first target frame includes marker information. The parsing terminal needs to further determine the first target frame based on the marker information. Depending on an actual case of the first audio, an implementation of the marker information includes two technical solutions: A first case: When the sampling rate of the first audio is less than a first threshold, the marker information is a characteristic sound; and a second case: When the sampling rate of the first audio is greater than or equal to a first threshold, the marker information is a synchronization frame marker. The following separately describes the two cases in detail.

First case: When the sampling rate of the first audio is less than the first threshold, the marker information is a characteristic sound.

In this embodiment, when detecting that the sampling rate of the first audio is less than the first threshold, the parsing terminal can determine that the marker information in the first target frame and a second target frame in the first audio is a characteristic sound. In this case, a specific method of the parsing terminal detecting the marker information is as follows: the parsing terminal determines a target frame that includes a first characteristic sound with duration greater than or equal to preset duration and that is in the first audio, as the first target frame.

In this embodiment, the first characteristic sound may be detected by using a sound detection method. A manner of detecting a characteristic sound may be any manner in the conventional technology. This is not limited in this embodiment of this application. In a specific work process, the first characteristic sound may be a human voice. For example, after it is detected that a period without a human voice is greater than a preset period, a frame in which a moment at which a human voice is detected again is located is determined as the first target frame.

Further, for the characteristic sound, a more detailed implementation may be further agreed on between the playback terminal and the parsing terminal. For example, in a state in which human voice detection is enabled, the parsing terminal determines a target frame in which a particular speech is located as the first target frame only when detecting the particular speech.

In this embodiment, when the sampling rate of the first audio is less than the first threshold, the parsing terminal determines the first target frame by determining the first characteristic sound. In this way, a starting position (that is, the first target frame) in which the watermark is embedded is determined by using the characteristic sound, with no need to embed a synchronization frame marker into the first audio. Therefore, it is ensured that the first target frame that marks the position in which the watermark is embedded can be found in the first audio, regardless of whether the sampling rate of the first audio is greater than or less than the first threshold.

Second case: When the sampling rate of the first audio is greater than or equal to the first threshold, the marker information is a synchronization frame marker.

In this embodiment, when determining that the sampling rate of the first audio is greater than or equal to the first threshold, the parsing terminal can determine that the marker information in the first target frame in the first audio is a synchronization frame marker. A method of the parsing terminal performing parsing to obtain the synchronization frame marker specifically includes the following steps.

1. The parsing terminal obtains, frame by frame, a first ratio of an energy value of an intermediate frequency portion to an energy value of a low frequency portion in the first audio.

In this embodiment, a method of the playing terminal adding a synchronization frame marker is as follows: increasing an energy value of a first sampling point in the intermediate frequency portion, to increase the first ratio of the energy value of the intermediate frequency portion to the energy value of the low frequency portion. Therefore, the parsing terminal may determine the synchronization frame marker based on the first ratio.

2. When obtaining an initial target frame with a first ratio greater than or equal to a second threshold, the parsing terminal detects, frame by frame in a sliding window manner, frames that are after the initial target frame and that are in the first audio, to obtain a second ratio of an energy value of an intermediate frequency portion to an energy value of a low frequency portion in each sliding window.

In this embodiment, the parsing terminal obtains, frame by frame, a first ratio of an energy value of an intermediate frequency portion to an energy value of a low frequency portion of a sampling point in each frame. When finding a first sampling point with a first ratio greater than or equal to the second threshold, the parsing terminal determines a target frame in which the first sampling point is located, as the initial target frame. However, one frame has 2048 sampling points, and the first sampling points are only some of the 2048 sampling points. Therefore, after the first sampling point that meets the first ratio is found, there may be an offset between the first target frame in which the first sampling point is actually located and the initial target frame in which the first sampling point is currently located. To resolve the problem, the parsing terminal needs to detect, frame by frame in the sliding window manner, the frames that are after the initial target frame and that are in the first audio, to obtain the second ratio of the energy value of the intermediate frequency portion to the energy value of the low frequency portion in each sliding window.

3. The parsing terminal determines a frame in which a sliding window with a largest second ratio is located, as the first target frame.

Figure 8:
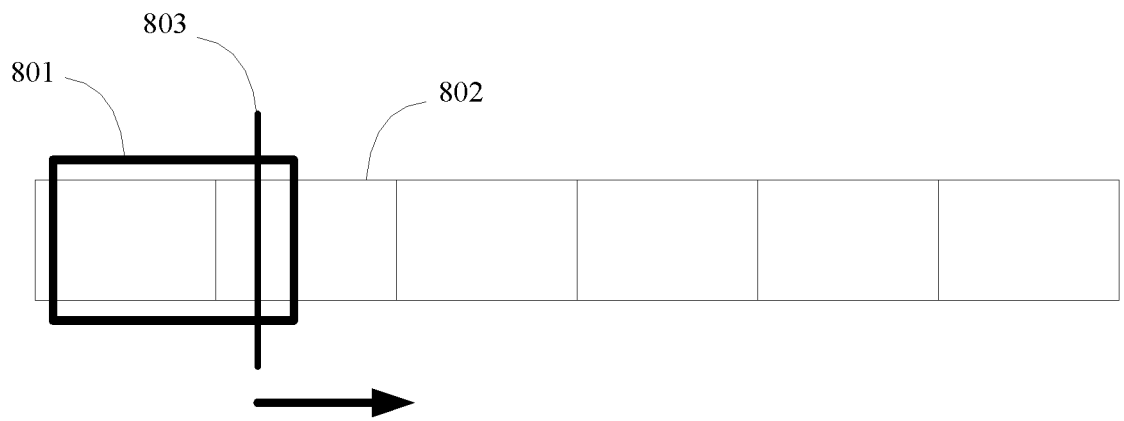
FIG. 8 is a schematic diagram of another embodiment of an audio watermark parsing method according to an embodiment of this application.

In this embodiment, as shown in FIG. 8, an initial target frame 801 is an initial sliding window 801 generated by the parsing terminal. The initial target frame 801 and a first target frame 802 overlap. A first sampling point 803 is located in an overlapping portion. The parsing terminal needs to make the sliding window 801 coincide exactly with the first target frame 802 to determine a position of the first target frame. In this regard, a specific work manner of the parsing terminal is as follows: detecting, in the sliding window manner, a second ratio of an energy value of an intermediate frequency portion to an energy value of a low frequency portion in each sliding window 801. Because the playback terminal actively increases energy of an intermediate frequency portion of the first target frame 802, a window with a largest second ratio is a window in which the first target frame is located. In this manner, the sliding window 801 coincides with the first target frame 802. Therefore, in a sliding window detection manner, the synchronization frame marker is found, an offset problem caused in a search process is effectively prevented, and precision of subsequent watermark detection is improved.

It should be noted that according to the method for detecting the synchronization frame marker, the synchronization frame marker is determined by detecting a first ratio of an energy value of an intermediate frequency portion to an energy value of a low frequency portion in the first audio. However, in an actual work process, the following case may also exist in original content (that is, non-watermarked content) of the first audio: A ratio of an energy value of an intermediate frequency portion to an energy value of a low frequency portion is greater than the first ratio. This results in erroneous detection of the synchronization frame marker. Actually, when the synchronization frame marker is compared with the original content of the first audio, an essential difference is as follows: In the synchronization frame marker, there is a sudden increase in the energy value of the first sampling point in the intermediate frequency portion relative to the low frequency portion. However, in a state of natural recording, there is no such sudden increase in audio. Therefore, based on this characteristic, when determining, in the manner in step 3 above, that the target frame in which the sliding window is located is the first target frame, the parsing terminal may further determine, by performing the following steps, whether the synchronization frame marker in the current target frame is the true synchronization frame marker. In this way, erroneous detection is prevented.

4. The parsing terminal obtains a first sampling point with a largest energy value of an intermediate frequency portion from the sliding window with the largest second ratio.

In this embodiment, the first sampling point is a point with a largest energy value in the current window.

5. The parsing terminal obtains a third sampling point that is earlier than the first sampling point for a preset length.

In this embodiment, the third sampling point precedes the first sampling point in time domain. The preset length between the third sampling point and the first sampling point may be set based on an actual requirement by persons skilled in the art, or may be determined by the parsing terminal based on parameters such as the sampling rate. This is not limited in this embodiment of this application.

6. The parsing terminal determines a portion with a ratio of an energy value of the first sampling point to an energy value of the third sampling point greater than a seventh threshold, as the synchronization frame marker.

Figure 9A:
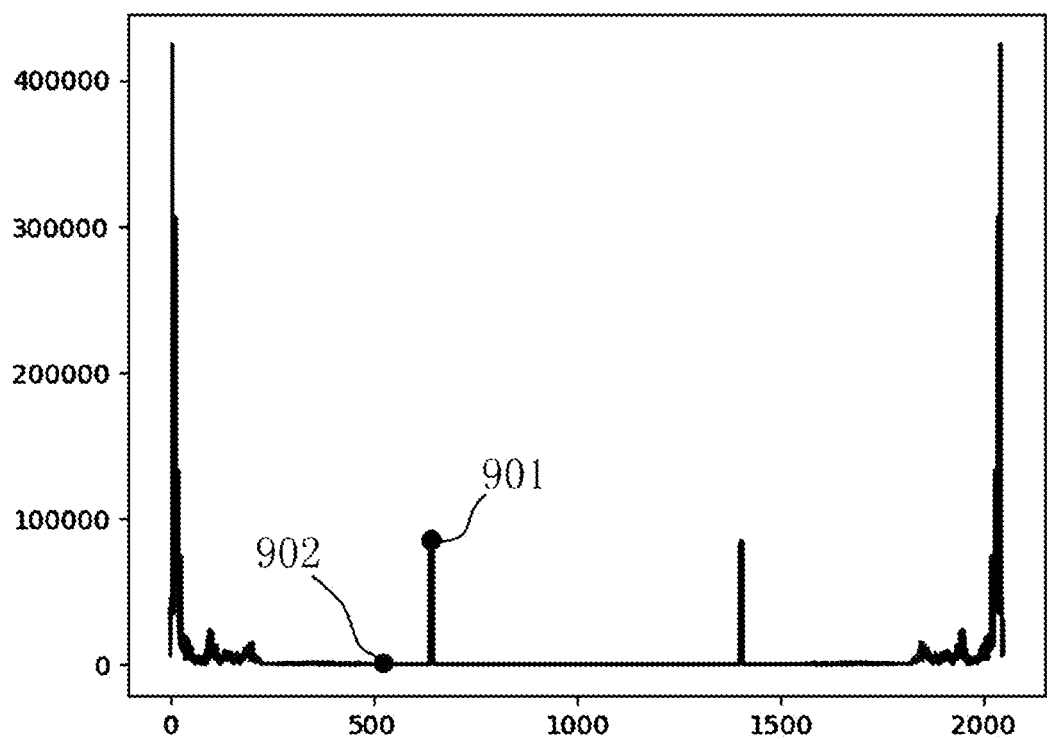
FIG. 9a is a schematic diagram of another implementation of an audio watermark parsing method according to an embodiment of this application.
Figure 9B:
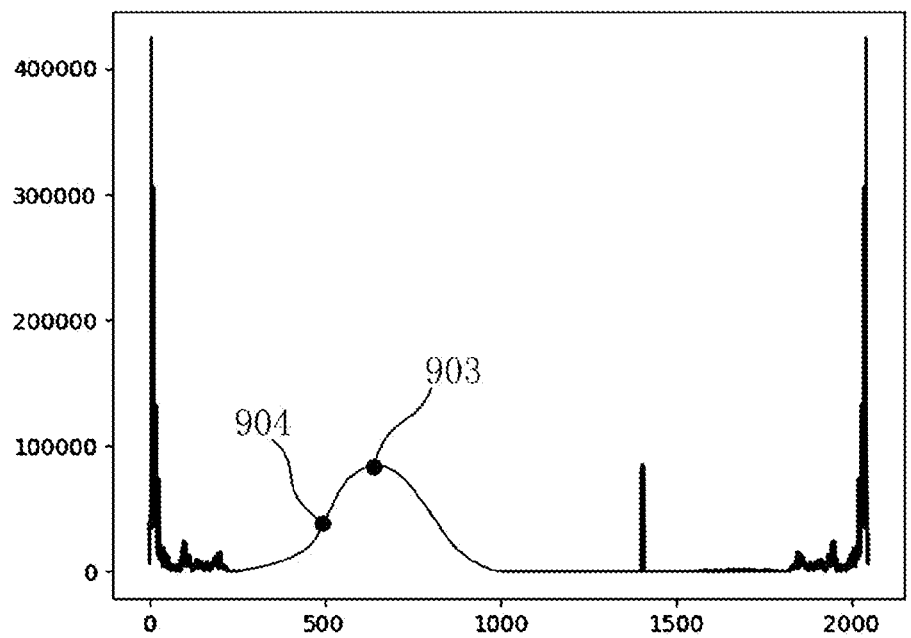
FIG. 9b is a schematic diagram of another implementation of an audio watermark parsing method according to an embodiment of this application.

In this embodiment, with reference to FIG. 9a and FIG. 9b, FIG. 9a shows the first target frame to which the synchronization frame marker is added, and FIG. 9b shows a common target frame to which the synchronization frame marker is not added. In each of the two diagrams in FIG. 9a and FIG. 9b, an energy ratio of an intermediate frequency portion to a low frequency portion meets the preset condition. Therefore, in this case, based on only the energy ratio of the intermediate frequency portion to the low frequency portion, it is not possible to determine which frame is the target frame to which the synchronization frame marker is added. As a result, erroneous detection occurs. In this regard, by using a method shown in steps 4 to 6 above, it is assumed that there are three sampling points between a first sampling point 901 and a third sampling point 902 in FIG. 9a. It can be learned that energy of the first sampling point increases suddenly relative to energy of the third sampling point. In FIG. 9b, in a waveform diagram with the synchronization frame marker not added, an energy value changes smoothly. When there are three sampling points between a first sampling point 903 and a third sampling point 904, an energy value of the first sampling point 903 does not change significantly relative to an energy value of the third sampling point 904. Therefore, by using the method, the synchronization frame marker can be accurately identified, preventing occurrence of erroneous detection.

In this embodiment, in the manner of using a characteristic sound and the manner of using a synchronization frame marker, the parsing terminal can detect, in the first audio, the first target frame that is determined by the playback terminal, regardless of a value of the sampling rate of the first audio.

702: The parsing terminal determines a second target frame that meets a second preset condition and that is after the first target frame.

In this embodiment, after detecting the first target frame, the parsing terminal may continue to search for, with the first target frame as a positioning frame, the second target frame that is after the first target frame. The second target frame is embedded with the audio watermark and meets the second preset condition. The parsing terminal can quickly find, based on the second preset condition, the second target frame that is after the first target frame.

Optionally, because multi-cycle watermark embedding is used for the first audio, and one first target frame and one second target frame are included in each cycle, the parsing terminal may alternatively obtain, when performing offline parsing, a second target frame that is before the first target frame. For ease of understanding, only searching for a second target frame that is after the first target frame is used for description in this embodiment of this application, but this does not constitute a limitation on the solution in this embodiment of this application.

Figure 10:
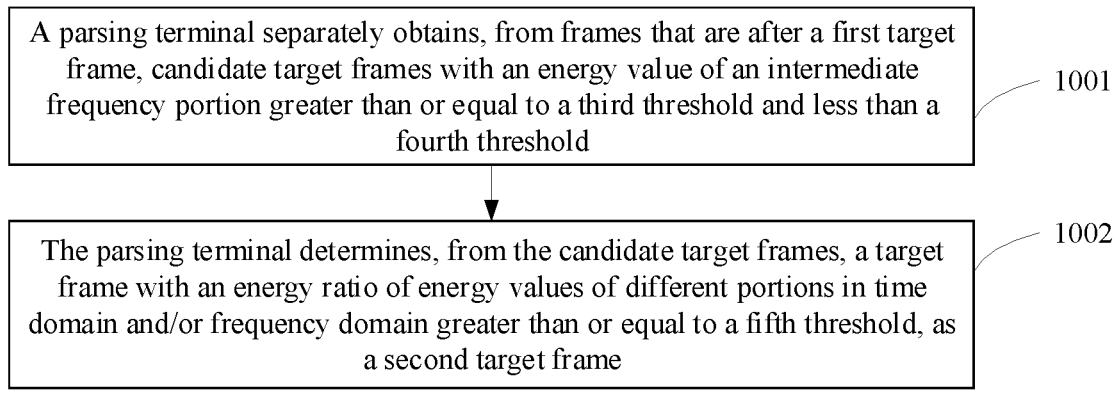
FIG. 10 is a schematic diagram of another embodiment of an audio watermark parsing method according to an embodiment of this application.

Optionally, as shown in FIG. 10, the parsing terminal may specifically determine the second target frame by performing the following steps.

1001: The parsing terminal separately obtains, from frames that are after the first target frame, candidate target frames with an energy value of an intermediate frequency portion greater than or equal to a third threshold and less than a fourth threshold.

In this embodiment, the playback terminal embeds the watermark into an intermediate frequency area of the second target frame. If energy of the intermediate frequency area is excessively low, erroneous parsing easily occurs or the watermark cannot be detected after the watermark is embedded. If energy of the intermediate frequency area is excessively high, a sonic boom occurs after the watermark is embedded. Therefore, based on this characteristic, the parsing terminal first determines a target frame with an energy value of an intermediate frequency portion greater than or equal to the third threshold and less than the fourth threshold, as a candidate target frame that may be the second target frame.

1002: The parsing terminal determines, from the candidate target frames, a target frame with an energy ratio of energy values of different portions in time domain and/or frequency domain greater than or equal to a fifth threshold, as the second target frame.

In this embodiment, the playback terminal embeds the audio watermark by changing the energy ratio of the second target frame. Therefore, based on a specific manner in which the playback terminal embeds the audio watermark, the parsing terminal determines, from the candidate target frames, a target frame with an energy ratio of energy values of different portions in time domain and/or frequency domain greater than or equal to the fifth threshold, as the second target frame.

In this embodiment, by performing the foregoing steps, the parsing terminal determines the second target frame. Then, the parsing terminal may start parsing the second target frame to obtain the watermark.

703: The parsing terminal parses the second target frame to obtain the audio watermark.

In this embodiment, the playback terminal embeds the audio watermark into the second target frame. Therefore, when obtaining the second target frame, the parsing terminal may parse the second target frame to obtain the embedded audio watermark.

Figure 11:
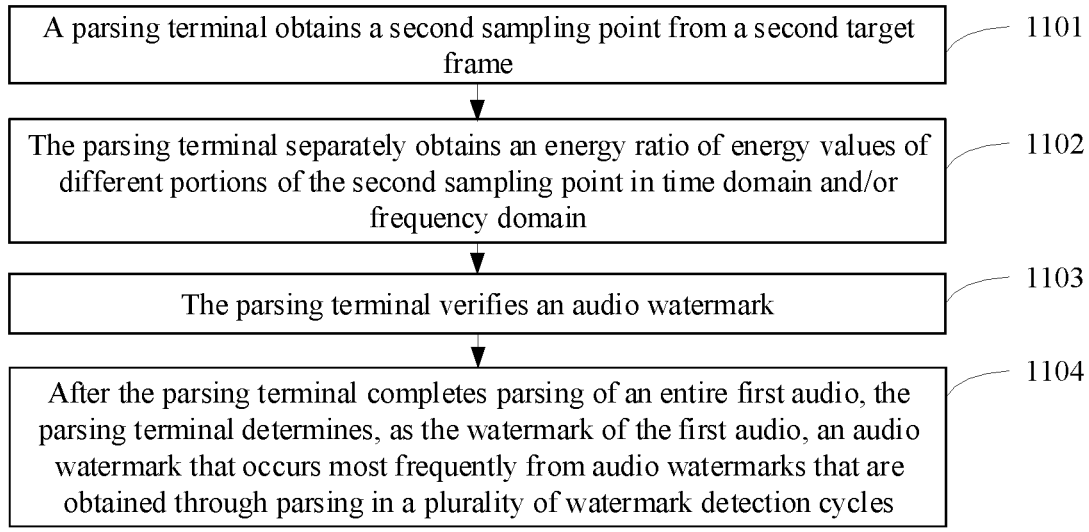
FIG. 11 is a schematic diagram of another embodiment of an audio watermark parsing method according to an embodiment of this application.

Refer to FIG. 11. As shown in FIG. 11, optionally, the parsing terminal parses the second target frame to obtain the audio watermark by performing the following steps.

1101: The parsing terminal obtains a second sampling point from the second target frame.

In this embodiment, the second sampling point is a sampling point with an energy ratio greater than or equal to the fifth threshold in the second target frame. The parsing terminal obtains the second sampling point from the second target frame. The second sampling point records watermark information embedded by the playback terminal.

1102: The parsing terminal separately obtains an energy ratio of energy values of different portions of the second sampling point in time domain and/or frequency domain.

In this embodiment, when embedding the audio watermark, the playback terminal may change the energy ratio of the second sampling point by using the following three different solutions: A first solution: changing a ratio of energy values of different portions in time domain; a second solution: changing a ratio of energy values of different portions in frequency domain; and a third solution: changing both a ratio of energy values of different portions in time domain and a ratio of energy values of different portions in frequency domain. Therefore, based on different watermark embedding manners, the parsing terminal needs to use corresponding means for parsing. For ease of understanding, the following describes the three manners in detail with reference to the accompanying drawings.

First solution: changing a ratio of energy values of different portions in time domain.

In this embodiment, the playback terminal embeds the audio watermark by changing a ratio of energy values of different portions in time domain. Specifically, when a ratio of an energy value of a second half to an energy value of a first half of the second sampling point is greater than the fifth threshold, it is agreed on that a digit corresponding to the ratio is 0; and when a ratio of an energy value of a first half to an energy value of a second half of the second sampling point is greater than the fifth threshold, it is agreed on that a digit corresponding to the ratio is 1.

Figure 12A:
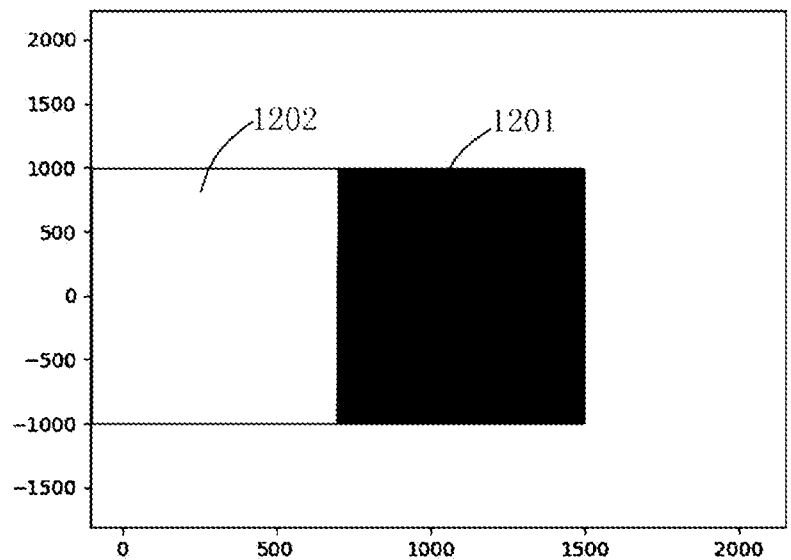
FIG. 12a is a schematic diagram of another implementation of an audio watermark parsing method according to an embodiment of this application.
Figure 12B:
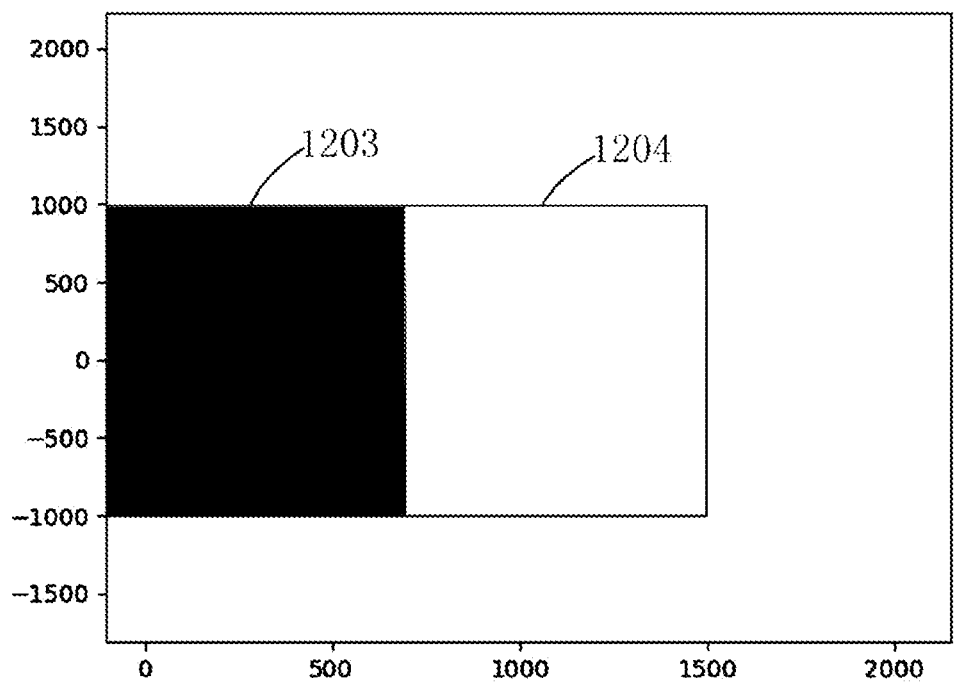
FIG. 12b is a schematic diagram of another implementation of an audio watermark parsing method according to an embodiment of this application.

According to the watermark embedding rules, with reference to FIG. 12a and FIG. 12b, energy distribution diagrams that are of the second target frame and that are obtained by the parsing terminal are two cases shown in FIG. 12a and FIG. 12b, respectively. In the energy distribution diagrams, a dark portion represents a high-energy area, and a white portion represents a low-energy area. Therefore, based on the energy distribution diagrams, the parsing terminal can intuitively obtain energy distribution of the second target frame. In the energy distribution diagram shown in FIG. 12a, an energy value of a second half 1201 is significantly greater than an energy value of a first half 1202 of the second target frame. When the parsing terminal obtains through calculation that a ratio of the energy value of the second half 1201 to the energy value of the first half 1202 of the second sampling point is greater than the fifth threshold, the parsing terminal determines a watermark embedded into the second target frame shown in FIG. 12a, as 0. In the energy distribution diagram shown in FIG. 12b, an energy value of a first half 1203 is significantly greater than an energy value of a second half 1204 of the second target frame. When the parsing terminal obtains through calculation that a ratio of the energy value of the first half 1203 to the energy value of the second half 1204 of the second sampling point is greater than the fifth threshold, the parsing terminal determines a watermark embedded into the second target frame shown in FIG. 12b, as 1.

It should be noted that in the parsing process, the energy ratio is determined with a midpoint of the target frame in time domain as a boundary. After the ratio of the first half and the second half is obtained, parsing is performed according to the preset rules. However, in an actual work process, when the first audio is trans-recorded, a high-energy portion increases in time domain due to a factor such as an echo or a reverberation at a venue. For example, when the audio watermark is 1, the midpoint in time domain is used as a boundary, and the ratio of the energy value of the first half to the energy value of the second half is greater than or equal to the fifth preset value. However, due to presence of an echo or a reverberation during trans-recording, the high-energy area crosses the midpoint in time domain. This affects a value of the energy ratio, and results in a case that the parsing terminal cannot obtain the watermark based on the energy ratio. To resolve the problem, when embedding a watermark, the playback terminal further provides a method for changing an energy ratio in frequency domain, to overcome an impact caused by an echo or a reverberation occurred during trans-recording on energy distribution in time domain.

Second solution: changing a ratio of energy values of different portions in frequency domain.

In this embodiment, when embedding the audio watermark, the playback terminal changes an energy ratio of the second sampling point in frequency domain in a manner similar to the foregoing manner, to implement embedding of the watermark. For a specific implementation, refer to the method for changing an energy ratio of different portions in time domain. A difference lies in that in this implementation, a frequency in frequency domain is used as a boundary, instead of using a time in time domain as a boundary.

Therefore, when the parsing terminal performs parsing to obtain the audio watermark, obtained energy distribution diagrams of the second target frame are shown in FIG. 5g. In the second sampling point, a midpoint in frequency domain is used as a boundary. In the energy distribution diagrams, a dark portion represents a high-energy area, and a white portion represents a low-energy area. Therefore, based on the energy distribution diagrams, the parsing terminal can intuitively obtain energy distribution of the second target frame. As shown in FIG. 5g, that a ratio of an upper half to a lower half is greater than the fifth threshold represents a digit 1. That a ratio of a lower half to an upper half is greater than the fifth threshold represents a digit 0. In this way, an audio watermark is embedded by changing an energy ratio in frequency domain, and an impact caused by an echo or a reverberation occurred during trans-recording on energy distribution in time domain is overcome.

Third solution: changing both a ratio of energy values of different portions in time domain and a ratio of energy values of different portions in frequency domain.

In this embodiment, when embedding the audio watermark, the playback terminal uses both the first solution and the second solution. First, by using a method in the first solution, an energy ratio of a first half and a second half of the second sampling point in time domain is adjusted, to implement a first step of watermark embedding. As shown in FIG. 5h, when a ratio of an energy value of a first half to an energy value of a second half of the second sampling point is greater than the fifth threshold, an audio watermark of a digit 1 is embedded. Further, to prevent an echo or a reverberation occurred during trans-recording from affecting energy distribution of an audio watermark in time domain, as shown in FIG. 5h, the method in the second solution is used for the second half (that is, a low-energy portion) in FIG. 5h, and an energy ratio of a high frequency portion to a low frequency portion is changed.

In a manner provided in the third solution, a large watermark and a small watermark are simultaneously added to the second sampling point. The large watermark and the small watermark separately record the same digit. The large watermark is a watermark obtained by changing the energy ratio of the first half and the second half of the second sampling point in time domain. The small watermark is a watermark obtained by changing the energy ratio of the high frequency portion and the low frequency portion of the low-energy portion of the second sampling point.

Further, for the watermarks shown in FIG. 5h, to prevent an echo or a reverberation occurred during trans-recording from affecting energy distribution in time domain, the low-energy portion of the audio watermark may be further divided. As shown in FIG. 5i, when a small watermark is embedded into the low-energy portion of the second sampling point, the low-energy portion is divided into two portions in time domain, respectively denoted as a first portion and a second portion. The first portion is an area close to a high-energy portion, and the second portion is an area away from the high-energy portion. When the small watermark is embedded, only an energy ratio of a high frequency portion to a low frequency portion of the second portion is changed. For the first portion, because the first portion is close to the high-energy portion, a reverberation occurred during trans-recording may result in a case that energy of the first portion increases accordingly. Therefore, an energy ratio of a high frequency portion and a low frequency portion of the first portion is no longer changed, eliminating an impact caused by an echo or a reverberation occurred during trans-recording on energy distribution in time domain. The small watermark is only embedded, by changing an energy ratio of a high frequency portion and a low frequency portion, into the second portion that is away from the high-energy portion.

It should be noted that for the audio watermarks shown in FIG. 5i above, the low-energy portion is divided into two portions in time domain for processing. In an actual work process, persons skilled in the art may divide the low-energy portion into more portions in time domain based on an actual requirement. This is not limited in this embodiment of this application.

For the audio watermarks that the playback terminal embeds by using the third solution, when performing parsing, the parsing terminal first performs parsing to obtain the large watermark. For a manner of performing parsing to obtain the large watermark, refer to the first solution. Then, the parsing terminal performs parsing to obtain the small watermark that is in the large watermark. For a specific method for performing parsing to obtain the small watermark, refer to the second solution. When digits obtained through parsing from the large watermark and the small watermark are the same, it is determined that watermark parsing is correct. In this way, the parsing terminal obtains the watermarks embedded into the current second target frame.

It should be noted that in the first solution to the third solution, the playback terminal embeds a binary watermark by changing an energy ratio. In an actual work process, based on an actual requirement, persons skilled in the art may implement embedding of a watermark that is in another number system, for example, a decimal system or a duodecimal system, by changing an energy ratio. This is not limited in this embodiment of this application.

In this embodiment, for the watermarks that the playback terminal embeds into the first audio in different manners, the parsing terminal performs parsing in corresponding manners. In the manners provided in this embodiment of this application, the audio watermarks have a good anti-interference capability. Therefore, during trans-recording, the audio watermark is not easily damaged in a case of recording through air. In addition, the parsing terminal can accurately obtain through parsing the audio watermark embedded by the playback terminal. Therefore, the audio watermark embedding solution has good stability and accuracy.

It should be noted that, for example, the audio watermark is a number "14". In this case, a first sequence corresponding to the audio watermark is "1110". When parsing the second target frame to obtain the audio watermark, the parsing terminal first parses a first second sampling point in the manner described in step 703 above to obtain a first element "1" in the first sequence. In this way, a first digit in the first sequence is obtained through parsing. In this case, a first sub-cycle of a watermark parsing cycle is completed. Then, step 703 above is performed cyclically. The parsing terminal obtains a second second sampling point from the second target frame, and performs parsing in the same manner to obtain a second element "1" in the first sequence, thereby obtaining a second digit in the first sequence through parsing; and so on. By analogy, the parsing terminal obtains the audio watermark through parsing in the complete watermark parsing cycle that includes four watermark parsing sub-cycles.

Optionally, when the parsing terminal determines the first target frame, there is a deviation of a starting position and a deviation that occurs because sampling points are lost during recording. These deviations result in a case that the subsequent second target frame also has a deviation accordingly. Consequently, the audio watermark embedded into the second target frame is affected by energy of a next frame. Therefore, the parsing terminal needs to preprocess the second target frame, to prevent an impact caused by a change in the energy of the next frame. In this case, energy of two ends of the second target frame is removed. A length of removal may be determined based on an actual requirement by persons skilled in the art. For example, eight sampling points are cut at both a head and a tail. Alternatively, the length of removal may be determined by the parsing terminal based on preset logic. For example, the parsing terminal adjusts the length of removal based on a length of a detection cycle. This is not limited in this embodiment of this application. A portion of a preset length is removed from a head portion and a tail portion of the second target frame, and only an intermediate portion remains. In this way, a second target frame is finally obtained. This eliminates interference caused by the deviations.

In this embodiment, in the foregoing manner, the parsing terminal obtains the audio watermark by parsing the first audio.

1103: The parsing terminal verifies the audio watermark.

In this embodiment, in a preferable implementation, a first sequence embedded into the audio watermark includes a check bit. The parsing terminal verifies integrity of the first sequence based on the check bit, to ensure accuracy of watermark parsing. For example, as in the foregoing example, the first sequence is "11101", and a parity check manner is agreed on between the playback terminal and the parsing terminal. In this case, a last bit in the first sequence is the check bit. When a last digit is 1, it indicates that the first sequence includes an odd quantity of digits "1" except the check bit. Therefore, after obtaining the first sequence through parsing, the parsing terminal determines, based on a value of the last bit in the first sequence, whether the first sequence obtained through parsing includes an odd quantity of digits 1. In this way, the parsing terminal can determine whether current parsing performed for the first sequence is complete.

1104: After the parsing terminal completes parsing of the entire first audio, the parsing terminal determines, as the watermark of the first audio, an audio watermark that occurs most frequently from audio watermarks that are obtained through parsing in a plurality of watermark detection cycles.

In this embodiment, the first audio includes a plurality of groups of a first target frame and a second target frame. One first target frame and one second target frame form a watermark detection cycle. The same audio watermark is embedded in each watermark detection cycle. However, in an actual parsing process, the parsing terminal may encounter some parsing errors, resulting in a case that not all audio watermarks obtained through parsing in all the watermark detection cycles are same sequences. According to experimental observations, when a parsing error occurs, an erroneous audio watermark obtained from erroneous parsing is always random and does not repeat itself. Therefore, from the audio watermarks that are obtained through parsing in the plurality of watermark detection cycles, the audio watermark that occurs most frequently can be determined as the correct audio watermark. Therefore, in both the multi-cycle determining manner and the parity check manner, the correct watermark embedded into the first audio is obtained through accurate parsing, further preventing the parsing terminal from performing erroneous parsing.

Optionally, after determining transmission integrity of the first sequence, the parsing terminal may perform inter-number system conversion on the first sequence based on a requirement, for example, convert the first sequence that is in a binary system into a number that is in a decimal system, and a number 14 is finally obtained. In this way, the audio watermark in the first audio is finally verified.

603: The parsing terminal determines the playback terminal based on the audio watermark.

In this embodiment, the audio watermark is associated with the playback terminal. Therefore, based on the audio watermark obtained through parsing from the first audio, a playback terminal that adds the audio watermark to the current first audio can be learned of. For example, in a real-time conference scenario, audio content played by playback terminals at a venue A, a venue B, and a venue C is identical, but audio watermarks embedded by the playback terminals when the playback terminals play same audio are different. By performing parsing to obtain an audio watermark, the parsing terminal can learn of a venue at which a playback terminal plays the current first audio, implementing source tracing for the first audio.

It should be noted that the audio watermark addition method and the audio watermark parsing method provided in embodiments of this application may be used in a variety of different usage scenarios. For ease of understanding, with reference to the accompanying drawings, the following describes usage scenarios of the methods provided in embodiments of this application.

1. Remote Conference Scenario.

Figure 13:
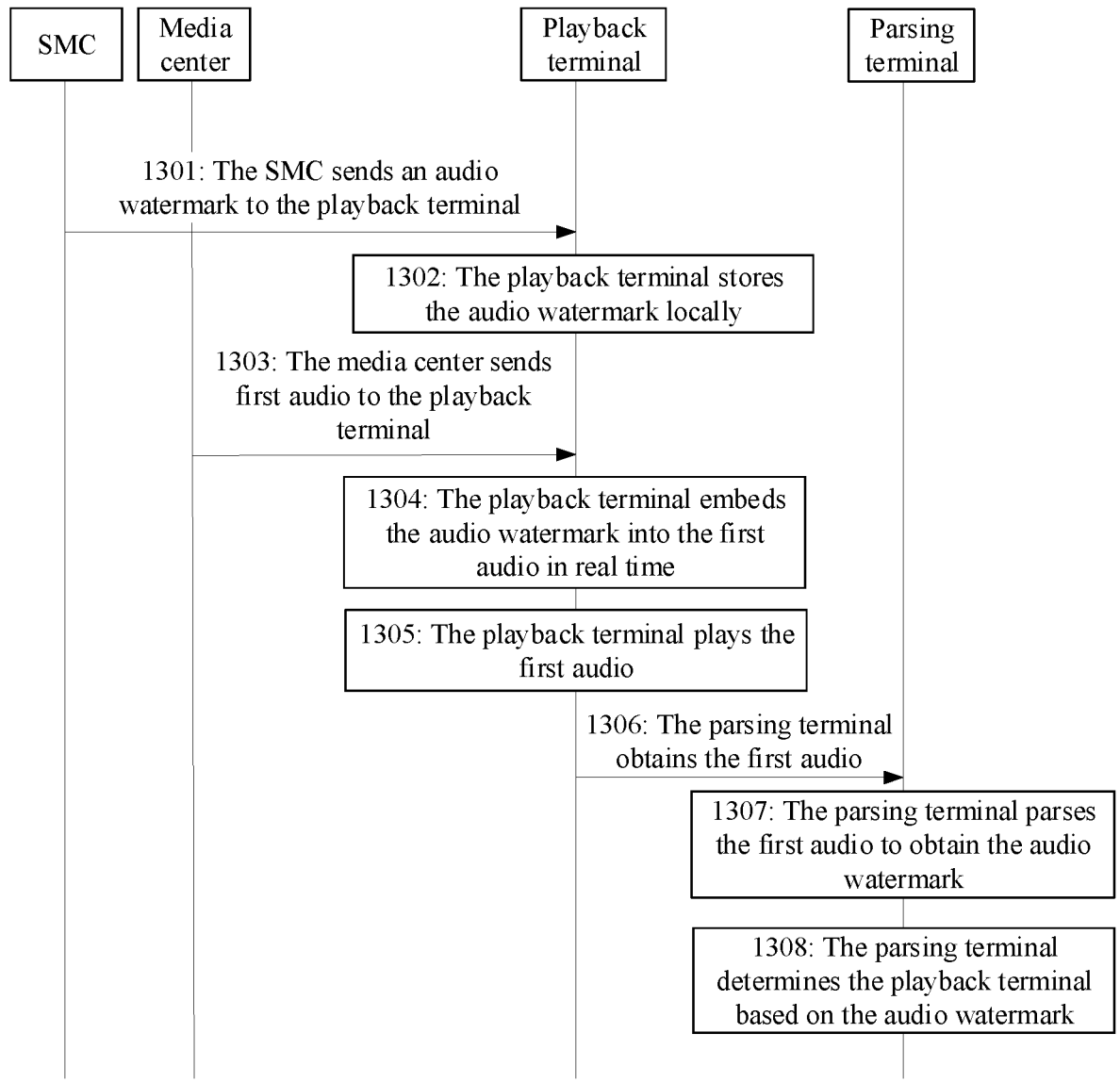
FIG. 13 is a schematic diagram of a usage scenario according to an embodiment of this application.

An architecture in this embodiment is shown in FIG. 13. On a basis of an architecture shown in FIG. 1, a service management center (SMC) is added. The SMC performs the following step.

1301: The SMC sends an audio watermark to a playback terminal.

In this embodiment, there may be a plurality of playback terminals. Audio watermarks sent by the SMC are in a one-to-one correspondence with the playback terminals, and are used to uniquely identify the playback terminals.

1302: The playback terminal stores the audio watermark locally.

In this embodiment, after obtaining the audio watermark, each playback terminal stores the audio watermark locally, so that the playback terminal subsequently embeds the audio watermark into a real-time audio stream when obtaining the audio stream.

1303: A media center sends first audio to the playback terminal.

In this embodiment, an audio stream from the media center may be generated by a playback terminal at a venue and then sent to the media center MCU. Then, the media center sends the audio stream to playback terminals at other venues in real time.

1304: The playback terminal embeds the audio watermark into the first audio in real time.

In this embodiment, the playback terminal embeds the locally stored audio watermark into the first audio in real time by using the audio watermark addition method provided in any one of the foregoing embodiments. For details, refer to the foregoing descriptions. Details are not described herein again.

1305: The playback terminal plays the first audio.

In this embodiment, the first audio played by the playback terminal is embedded with the audio watermark. An entire watermark embedding process is performed in real time, not affecting a live streaming effect of the first audio. In addition, for the played first audio, the playback terminal of the first audio can be found based on the audio watermark.

1306: A parsing terminal obtains the first audio.

In this embodiment, the parsing terminal may obtain the first audio through a digital channel or an air channel. The parsing terminal can parse the first audio that is obtained through trans-recording in these two manners.

1307: The parsing terminal parses the first audio to obtain the audio watermark.

In this embodiment, the parsing terminal parses the first audio to obtain the audio watermark by using the audio watermark parsing method provided in any one of the foregoing embodiments. For details, refer to the foregoing descriptions. Details are not described herein again.

1308: The parsing terminal determines the playback terminal based on the audio watermark.

In this embodiment, the audio watermark is associated with the playback terminal. Therefore, based on the audio watermark obtained through parsing from the first audio, a playback terminal that adds the audio watermark to the current first audio can be learned of In this way, source tracing is implemented for the first audio.

In this embodiment, the SMC allocates different venue identifiers (that is, audio watermarks) to playback terminals that are at the venue A, the venue B, and the venue C, respectively. These venue identifiers are associated with the playback terminals at the venues, and are used to uniquely identify the playback terminals at the venues. After obtaining the live-streamed audio stream from the media center MCU, the playback terminals at the venue A, the venue B, and the venue C perform the audio watermark addition method provided in embodiments of this application, to add the obtained venue identifiers to the played audio streams in real time as a watermark. In this way, audio played by the playback terminals at the venues is embedded with an audio watermark. Based on the audio watermark in the audio obtained through trans-recording, the parsing terminal can determine, based on the venue identifier recorded in watermark information in the audio stream, a specific venue at which the audio is trans-recorded. In this way, source tracing is implemented for the audio watermark.

2. Cloud On-Demand Scenario.

Figure 14:
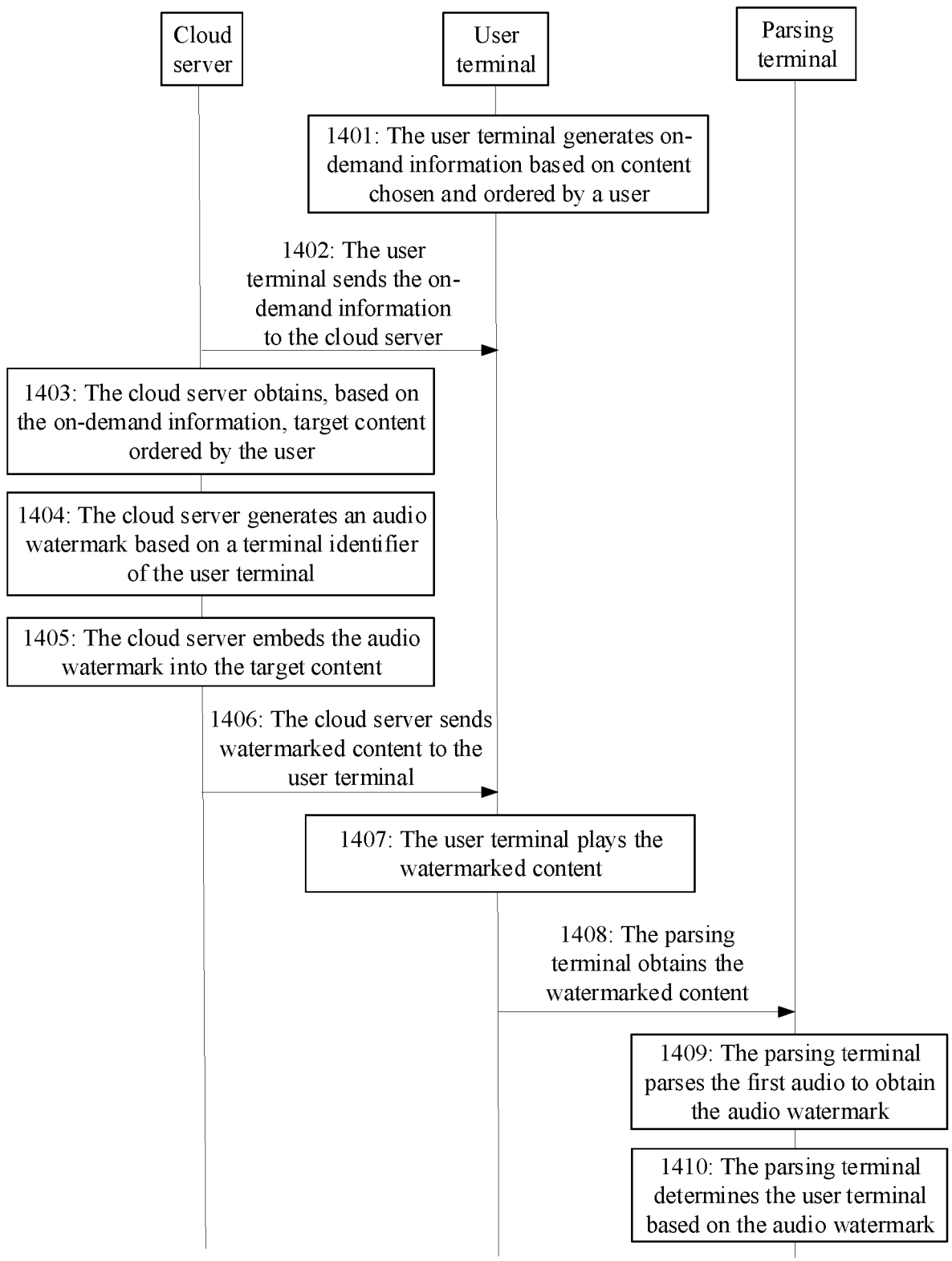
FIG. 14 is a schematic diagram of a usage scenario according to an embodiment of this application.

In this embodiment, refer to FIG. 14. As shown in FIG. 14, a user orders audio or video content that the user wants to watch, and sends on-demand information to a cloud server by using a terminal. The cloud server sends on-demand content to the terminal of the user in real time based on the on-demand information of the user. Specific steps are as follows.

1401: The user terminal generates the on-demand information based on content chosen and ordered by the user.

In this embodiment, the user chooses desired audio or video content on an interactive interface of the user terminal. In this case, the on-demand information is generated. The on-demand information is used to record the audio or video content ordered by the user.

1402: The user terminal sends the on-demand information to the cloud server.

In this embodiment, the user terminal sends the on-demand information to the cloud server, so that the cloud server learns of the content ordered by the user.

1403: The cloud server obtains, based on the on-demand information, target content ordered by the user.

In this embodiment, the cloud server obtains, from a library based on the on-demand information of the user, the target content ordered by the user.

1404: The cloud server generates an audio watermark based on a terminal identifier of the user terminal.

In this embodiment, the user terminal is an audio or video playback terminal. The audio watermark is associated with the user terminal and is used to uniquely identify the user terminal. In this way, the audio watermark is obtained.

1405: The cloud server embeds the audio watermark into the target content.

In this embodiment, the target content may be audio or a video. If the target content is a video, the cloud server embeds the audio watermark into audio content of the video. A specific manner in which the cloud server embeds the audio watermark into the target content may be any one of the audio watermark addition methods provided in embodiments of this application. For details, refer to the foregoing descriptions. It should be noted that in this case, the watermark embedding step may be performed by the cloud server, or it may be that the cloud server sends the audio watermark to the user terminal, and the user terminal performs the watermark embedding step. This is not limited in this embodiment of this application. By using the method provided in this embodiment of this application, the cloud server can embed the audio watermark into audio of the target content in real time while transmitting the target content to the user terminal, improving work efficiency.

1406: The cloud server sends watermarked content to the user terminal.

In this embodiment, audio or video content in the watermarked content is the content ordered by the user of the user terminal. The audio watermark is already added to the watermarked content.

1407: The user terminal plays the watermarked content.

In this embodiment, the audio watermark is already added to the content played by the user terminal. Therefore, if the user of the user terminal trans-records the content played by the terminal, the audio watermark remains in the content obtained through trans-recording. In this way, the user terminal trans-recording the content can be found.

1408: A parsing terminal obtains the watermarked content.

In this embodiment, the watermarked content may be audio embedded with the watermark, or a video with audio into which the watermark is embedded. The parsing terminal may obtain the watermarked content through a digital channel or an air channel. The parsing terminal can parse the first audio in the watermarked content that is obtained through trans-recording in these two manners.

1409: The parsing terminal parses the first audio to obtain the audio watermark.

In this embodiment, the parsing terminal parses the first audio to obtain the audio watermark by using the audio watermark parsing method provided in any one of the foregoing embodiments. For details, refer to the foregoing descriptions. Details are not described herein again.

1410: The parsing terminal determines the user terminal based on the audio watermark.

In this embodiment, the audio watermark is associated with the user terminal. Therefore, based on the audio watermark obtained through parsing from the first audio, a user terminal that adds the audio watermark to the current first audio can be learned of In this way, source tracing is implemented for the first audio.

In conclusion, the watermark addition method and the watermark parsing method provided in embodiments of this application may be applied to a variety of different scenarios with audio watermark addition and parsing requirements. The foregoing two manners are merely examples, and do not constitute a limitation on usage scenarios in this embodiment of this application.

From a perspective of a hardware structure, the foregoing method may be implemented by a physical device, or may be jointly implemented by a plurality of physical devices, or may be implemented by a logical function module inside a physical device. This is not specifically limited in embodiments of this application.

Figure 15:
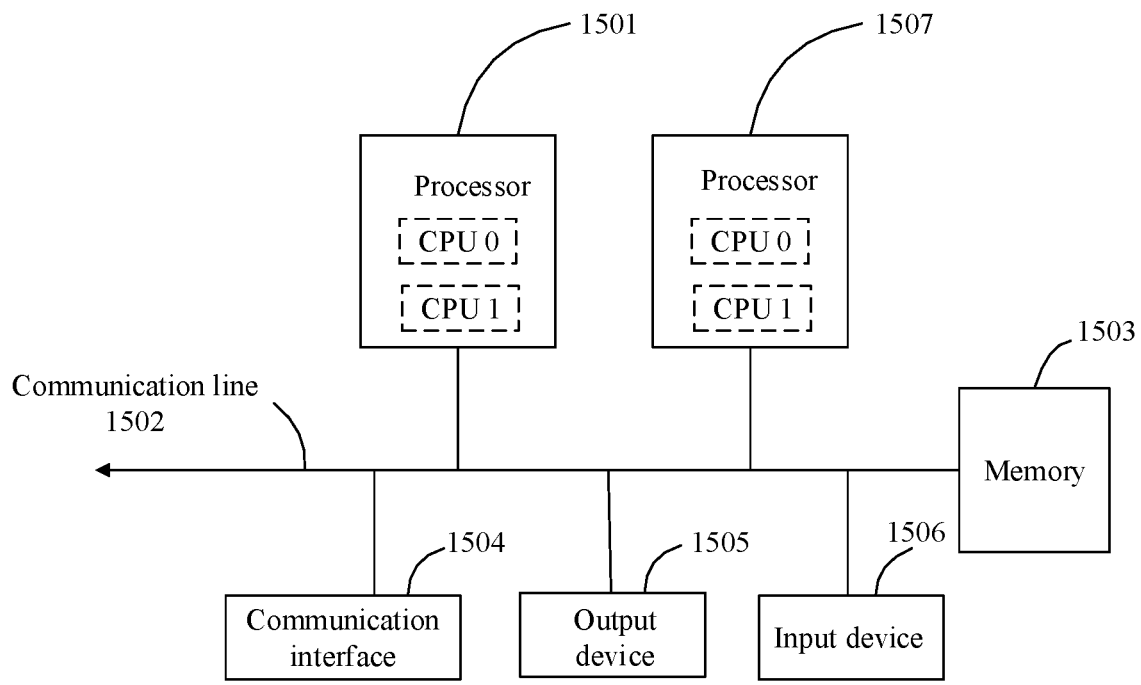
FIG. 15 is a schematic diagram of an electronic device according to an embodiment of this application.

For example, the foregoing method may be implemented by an electronic device in FIG. 15. FIG. 15 is a schematic diagram of a hardware structure of an electronic device according to an embodiment of this application. The electronic device may be the playback terminal or the parsing terminal in embodiments of the present disclosure. The electronic device includes at least one processor 1501, a communication line 1502, a memory 1503, and at least one communication interface 1504.

The processor 1501 may be a general-purpose central processing unit (CPU), a microprocessor, an application-specific integrated circuit (server IC), or one or more integrated circuits configured to control program execution of the solutions in this application.

The communication line 1502 may include a path for transferring information between the foregoing components.

The communication interface 1504 uses any apparatus such as a transceiver, and is configured to communicate with another device or a communication network, such as the Ethernet, a radio access network (RAN), or a wireless local area network (WLAN).

The memory 1503 may be a read-only memory ROM) or another type of static storage device that can store static information and instructions, or a random access memory (RAM) or another type of dynamic storage device that can store information and instructions, or may be an electrically erasable programmable read-only memory (EEPROM), a compact disc read-only memory (CD-ROM) or another compact disc storage, an optical disc storage (including a compressed optical disc, a laser disc, an optical disc, a digital versatile disc, a Blu-ray disc, or the like), a magnetic disk storage medium or another magnetic storage device, or any other medium that can be used for carrying or storing expected program code in a form of instructions or a data structure and that can be accessed by a computer. However, the memory 1503 is not limited thereto. The memory may exist independently, and is connected to the processor through the communication line 1502. Alternatively, the memory may be integrated with the processor.

The memory 1503 is configured to store computer-executable instructions for performing the solutions in this application, and the processor 1501 controls execution. The processor 1501 is configured to execute the computer-executable instructions stored in the memory 1503, to implement the audio watermark addition method or the audio watermark parsing method provided in the following embodiments of this application.

Optionally, the computer-executable instructions in this embodiment of this application may also be referred to as application program code. This is not specifically limited in this embodiment of this application.

During specific implementation, in an embodiment, the processor 1501 may include one or more CPUs, such as a CPU 0 and a CPU 1 in FIG. 15.

During specific implementation, in an embodiment, the electronic device may include a plurality of processors, such as the processor 1501 and a processor 1507 in FIG. 15. Each of the processors may be a single-core (single-CPU) processor or a multi-core (multi-CPU) processor. The processor herein may be one or more devices, circuits, and/or processing cores configured to process data (e.g., computer program instructions).

During specific implementation, in an embodiment, the electronic device may further include an output device 1505 and an input device 1506. The output device 1505 communicates with the processor 1501, and may display information in a plurality of manners. For example, the output device 1505 may be a liquid crystal display (LCD), a light emitting diode (LED) display device, a cathode ray tube (CRT) display device, or a projector. The input device 1506 communicates with the processor 1501, and may receive a user input in a plurality of manners. For example, the input device 1506 may be a mouse, a keyboard, a touchscreen device, or a sensor device.

The electronic device may be a general-purpose device or a dedicated device. During specific implementation, the electronic device may be a server, a wireless terminal device, an embedded device, or a device having a structure similar to that in FIG. 15. A type of the electronic device is not limited in this embodiment of this application.

In this embodiment of this application, the electronic device may be divided into functional units based on the foregoing method example. For example, each functional unit may be obtained through division based on each corresponding function, or two or more functions may be integrated into one processing unit. The integrated unit may be implemented in a form of hardware, or may be implemented in a form of a software function unit. It should be noted that in embodiments of this application, division into the units is an example, and is merely logical function division. During actual implementation, another division manner may be used.

Figure 16:
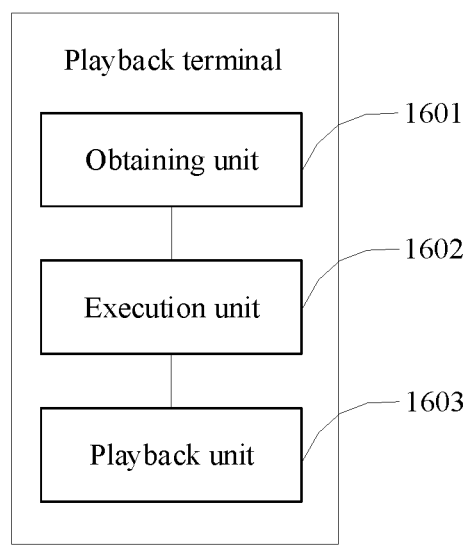
FIG. 16 is a schematic diagram of a playback terminal according to an embodiment of this application.

For example, when functional units are obtained through division in an integrated manner, FIG. 16 is a schematic diagram of a structure of a playback terminal according to an embodiment of this application.

As shown in FIG. 16, the playback terminal provided in this embodiment of this application includes: an obtaining unit 1601, configured to obtain first audio in real time; an execution unit 1602, configured to embed an audio watermark into the first audio obtained by the obtaining unit 1601, where the audio watermark is associated with the playback terminal; and a playback unit 1603, configured to play the first audio into which the execution unit 1602 embeds the audio watermark.

Optionally, the execution unit 1602 is further configured to: determine a first target frame that meets a first preset condition and that is in the first audio; determine a second target frame that meets a second preset condition and that is after the first target frame, where the first target frame is used to mark the second target frame; and embed the audio watermark into the second target frame.

Optionally, the execution unit 1602 is further configured to: determine, when a sampling rate of the first audio is greater than or equal to a first threshold, an audio frame with a maximum value of a low frequency portion in a first interval, as the first target frame; or determine, when a sampling rate of the first audio is less than a first threshold, an audio frame including a first characteristic sound, as the first target frame.

Optionally, when the sampling rate of the first audio is greater than or equal to the first threshold, the execution unit 1602 is further configured to: add a synchronization frame marker to the first target frame.

Optionally, the execution unit 1602 is further configured to: obtain a first sampling point, where the first sampling point is a sampling point in an intermediate frequency portion; and increase an energy value of the first sampling point, so that a ratio of the energy value of the first sampling point to an energy value of the low frequency portion is greater than or equal to a second threshold.

Optionally, when the sampling rate of the first audio is less than the first threshold, the execution unit 1602 is further configured to: when the first characteristic sound is detected and duration of the first characteristic sound is greater than or equal to preset duration, determine the audio frame including the first characteristic sound, as the first target frame.

Optionally, the execution unit 1602 is further configured to: determine a target frame with an energy value of an intermediate frequency portion greater than or equal to a third threshold and less than a fourth threshold, as the second target frame.

Optionally, the execution unit 1602 is further configured to: obtain a first sequence corresponding to the audio watermark, where the first sequence includes at least one element; obtain at least one second sampling point from the third target frame; and embed the at least one element in the first sequence into the at least one second sampling point, respectively, where one element in the first sequence corresponds to one second sampling point.

Optionally, the execution unit 1602 is further configured to: adjust an energy ratio of energy values of different portions of the second sampling point in time domain and/or frequency domain, where an energy ratio of one second sampling point is associated with one element in the first sequence.

Figure 17:
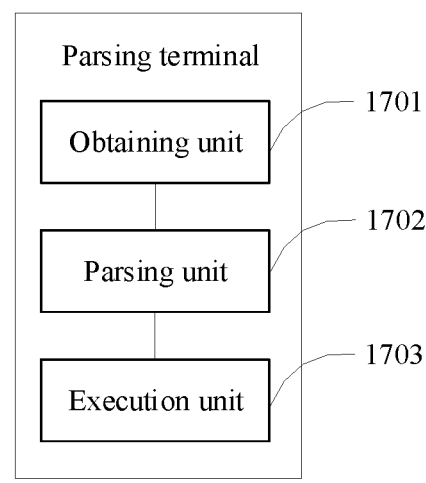
FIG. 17 is a schematic diagram of a parsing terminal according to an embodiment of this application.

As shown in FIG. 17, a parsing terminal provided in this embodiment of this application includes: an obtaining unit 1701, configured to obtain first audio, where the first audio is embedded with an audio watermark, the audio watermark is associated with a playback terminal, and the playback terminal is configured to embed the audio watermark into the first audio in real time; a parsing unit 1702, configured to parse the first audio obtained by the obtaining unit 1701, to obtain the audio watermark; and an execution unit 1703, configured to determine the playback terminal based on the audio watermark obtained through parsing performed by the parsing unit 1702.

Optionally, the parsing unit 1702 is further configured to: determine a first target frame that meets a first preset condition and that is in the first audio; determine a second target frame that meets a second preset condition and that is after the first target frame; and parse the second target frame to obtain the audio watermark.

Optionally, when a sampling rate of the first audio is less than a first threshold, the parsing unit 1702 is further configured to: determine a target frame that includes a first characteristic sound with duration greater than or equal to preset duration and that is in the first audio, as the first target frame.

Optionally, when a sampling rate of the first audio is greater than or equal to a first threshold, the parsing unit 1702 is further configured to: obtain, frame by frame, a first ratio of an energy value of an intermediate frequency portion to an energy value of a low frequency portion in the first audio; when obtaining an initial target frame with a first ratio greater than or equal to a second threshold, detect, in a sliding window manner, frames that are after the initial target frame and that are in the first audio, to obtain a second ratio of an energy value of an intermediate frequency portion to an energy value of a low frequency portion in each sliding window; and determine a frame in which a sliding window with a largest second ratio is located, as the first target frame.

Optionally, the first target frame includes a synchronization frame marker, and the parsing unit 1702 is further configured to: obtain a first sampling point with a largest energy value of an intermediate frequency portion from the sliding window with the largest second ratio; obtain a third sampling point that is earlier than the first sampling point for a preset length; determine a portion with a ratio of an energy value of the first sampling point to an energy value of the third sampling point greater than a seventh threshold, as the synchronization frame marker; and determine, based on the synchronization frame marker, the frame in which the sliding window with the largest second ratio is located, as the first target frame.

Optionally, the parsing unit 1702 is further configured to: separately obtain, from frames that are after the first target frame, candidate target frames with an energy value of an intermediate frequency portion greater than or equal to a third threshold and less than a fourth threshold; and determine, from the candidate target frames, a target frame with an energy ratio of energy values of different portions in time domain and/or frequency domain greater than or equal to a fifth threshold, as the second target frame.

Optionally, the parsing unit 1702 is further configured to: obtain a second sampling point from the second target frame, where the second sampling point is a sampling point whose energy ratio is greater than or equal to the fifth threshold and that is in the second target frame; separately obtain an energy ratio of energy values of different portions of the second sampling point in time domain and/or frequency domain; and obtain a first element associated with the energy ratio, where the first element is an element in a first sequence recorded in the audio watermark.

Optionally, a plurality of watermark detection cycles are included in the first audio, one audio watermark is separately obtained through parsing in each of the watermark detection cycles, and the parsing unit 1702 is further configured to: determine, as the watermark of the first audio, the audio watermark that occurs most frequently from the audio watermarks that are obtained through parsing in the plurality of watermark detection cycles.

Persons skilled in the art should be aware that in the foregoing one or more examples, functions described in the present disclosure may be implemented by hardware, software, firmware, or any combination thereof. When the functions are implemented by software, these functions may be stored in a computer-readable medium or transmitted as one or more instructions or code in a computer-readable medium. The computer-readable medium includes a computer storage medium and a communication medium. The communication medium includes any medium that facilitates transmission of a computer program from one place to another. The storage medium may be any available medium accessible to a general-purpose or a dedicated computer.

The objectives, technical solutions, and beneficial effects of the present disclosure are further described in detail in the foregoing specific implementations. It should be understood that the foregoing descriptions are merely specific implementations of the present disclosure.

In conclusion, the foregoing embodiments are merely intended for describing the technical solutions of this application, but not for limiting the technical solutions of this application. Although this application is described in detail with reference to the foregoing embodiments, persons of ordinary skill in the art should understand that they may still make modifications to the technical solutions described in the foregoing embodiments or make equivalent replacements to some technical features thereof, without departing from the scope of the technical solutions of embodiments of this application.

It may be clearly understood by persons skilled in the art that, for the purpose of convenient and brief description, for a specific work process of the system, apparatus, and unit described above, refer to a corresponding process in the foregoing method embodiments. Details are not described herein again.

In the several embodiments provided in this application, it should be understood that the disclosed audio watermark addition method, audio watermark parsing method, playback terminal, parsing terminal, electronic device, and computer-readable storage medium may be implemented in other manners. For example, the described apparatus embodiments are merely examples. For example, division into the units is merely logical function division. During actual implementation, another division manner may be used. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in an electrical, mechanical, or another form.

The units described as separate parts may or may not be physically separate, and parts displayed as units may or may not be physical units, that is, may be located in one position, or may be distributed on a plurality of network units. Some or all of the units may be selected based on actual requirements to achieve the objectives of the solutions of embodiments.

In addition, functional units in embodiments of this application may be integrated into one processing unit, each of the units may exist alone physically, or two or more units are integrated into one unit. The integrated unit may be implemented in a form of hardware, or may be implemented in a form of a software function unit.

When the integrated unit is implemented in the form of a software functional unit and sold or used as an independent product, the integrated unit may be stored in a computer-readable storage medium. Based on such an understanding, the technical solutions of this application essentially, or the part contributing to the conventional technology, or all or some of the technical solutions may be implemented in a form of a software product. The computer software product is stored in a storage medium and includes several instructions for instructing a computer device (which may be a personal computer, a server, a network device, or the like) to perform all or some of the steps of the methods described in embodiments of this application. The foregoing storage medium includes any medium that can store program code, such as a USB flash drive, a removable hard disk, a read-only memory (ROM), a random access memory (RAM), a magnetic disk, or an optical disc.

In conclusion, the foregoing embodiments are merely intended for describing the technical solutions of this application, but not for limiting the technical solutions of this application. Although this application is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of embodiments of this application.

What is claimed is:

1. An audio watermark-based audio playback method, carried out by a playback terminal, comprising:
    obtaining first audio in real time;
    forming a first watermark embedded audio by embedding an audio watermark associated with the playback terminal into the first audio; and
    playing the first watermark embedded audio,
    wherein the embedding an audio watermark comprises:
        determining a first target frame of the first audio that meets a first preset condition;
        determining a second target frame of the first audio that meets a second preset condition and that is after the first target frame, wherein the first target frame is used to mark the second target frame; and
        embedding the audio watermark into the second target frame of the first audio; and
    wherein the determining a first target frame of the first audio that meets a first preset condition comprises determining the first target frame in accordance with a sampling rate of the first audio by:
        determining, in accordance with the sampling rate of the first audio being greater than or equal to a first threshold, an audio frame with a maximum value of a low frequency portion in a first interval, as the first target frame; and
        determining, in accordance with the sampling rate of the first audio being less than the first threshold, an audio frame comprising a first characteristic sound, as the first target frame.

2. The method according to claim 1, wherein after the determining the first target frame, in accordance with the sampling rate of the first audio being greater than or equal to the first threshold, that is the audio frame with a maximum value of a low frequency portion in a first interval, the method further comprises:
    adding a synchronization frame marker to the first target frame.

3. The method according to claim 2, wherein the adding comprises:
    obtaining a first sampling point that is a sampling point in an intermediate frequency portion; and
    increasing an energy value of the first sampling point, so that a ratio of the energy value of the first sampling point to an energy value of the low frequency portion is greater than or equal to a second threshold.

4. The method according to claim 1, wherein the determining the first target frame, in accordance with the sampling rate of the first audio being less than the first threshold, that is the audio frame comprising a first characteristic sound comprises:
    determining the first target frame to be, in accordance with the first characteristic sound being detected and duration of the first characteristic sound being greater than or equal to preset duration, the audio frame comprising the first characteristic sound.

5. The method according to claim 1, wherein the determining a second target frame comprises:
    determining the second target frame that is a target frame with an energy value of an intermediate frequency portion greater than or equal to a third threshold and less than a fourth threshold.

6. The method according to claim 1, wherein the embedding the audio watermark comprises:
    obtaining a first sequence corresponding to the audio watermark, wherein the first sequence comprises at least one element;
    obtaining at least one second sampling point from a third target frame; and
    embedding the at least one element in the first sequence into the at least one second sampling point, respectively, wherein the at least one element in the first sequence corresponds to the at least one second sampling point.

7. The method according to claim 6, wherein the embedding the at least one element in the first sequence into the at least one second sampling point, respectively comprises:
    adjusting an energy ratio of energy values of different portions of the second sampling point in time domain and/or frequency domain, wherein an energy ratio of one of the at least one second sampling point is associated with one of the at least one element in the first sequence.

8. An audio watermark parsing method carried out by a parsing terminal, the method comprising:
    obtaining a first watermark embedded audio that is embedded with an audio watermark associated with a playback terminal that embedded the audio watermark into a first audio;
    parsing the first watermark embedded audio to obtain the audio watermark; and
    determining the playback terminal based on the audio watermark,
    wherein before the parsing the first watermark embedded audio to obtain the audio watermark, the method further comprises:
        determining a first target frame of the first watermark embedded audio that meets a first preset condition; and
        determining a second target frame of the first watermark embedded audio that meets a second preset condition and that is after the first target frame; and
        wherein the parsing the first watermark embedded audio comprises parsing the second target frame to obtain the audio watermark;
    wherein in accordance with a sampling rate of the first watermark embedded audio being less than a first threshold, the determining the first target frame comprises:

determining a target frame that comprises a first characteristic sound with duration greater than or equal to preset duration and that is in the first watermark embedded audio, as the first target frame; and wherein in accordance with a sampling rate of the first watermark embedded audio being greater than or equal to a first threshold, the determining the first target frame comprises:

obtaining, frame by frame, a first ratio of an energy value of an intermediate frequency portion to an energy value of a low frequency portion in the first watermark embedded audio;

detecting, in accordance with obtaining an initial target frame with a first ratio greater than or equal to a second threshold, in a sliding window manner, frames that are after the initial target frame and that are in the first watermark embedded audio, to obtain a second ratio of an energy value of an intermediate frequency portion to an energy value of a low frequency portion in each sliding window; and determining a frame in which a sliding window with a largest second ratio is located, as the first target frame.

9. The method according to claim 8, wherein the first target frame comprises a synchronization frame marker, and wherein the determining the frame in which a sliding window with a largest second ratio is located, as the first target frame comprises:

obtaining a first sampling point with a largest energy value of an intermediate frequency portion from the sliding window with the largest second ratio;

obtaining a third sampling point that is earlier than the first sampling point for a preset length;

determining a portion with a ratio of an energy value of the first sampling point to an energy value of the third sampling point greater than a seventh threshold, as the synchronization frame marker; and determining, based on the synchronization frame marker, a frame in which the sliding window with the largest second ratio is located, as the first target frame.

10. The method according to claim 8, wherein the determining the second target frame comprises:

separately obtaining, from frames that are after the first target frame, candidate target frames with an energy value of an intermediate frequency portion greater than or equal to a third threshold and less than a fourth threshold; and determining, from the candidate target frames, a target frame with an energy ratio of energy values of different portions in time domain and/or frequency domain greater than or equal to a fifth threshold, as the second target frame.

11. The method according to claim 10, wherein the parsing the second target frame to obtain the audio watermark comprises:

obtaining a second sampling point from the second target frame, wherein the second sampling point is a sampling point whose energy ratio is greater than or equal to the fifth threshold and that is in the second target frame;

separately obtaining an energy ratio of energy values of different portions of the second sampling point in time domain and/or frequency domain; and obtaining a first element associated with the energy ratio, wherein the first element is an element in a first sequence recorded in the audio watermark.

12. The method according to claim 8, wherein in the method, a plurality of watermark detection cycles are comprised, one audio watermark is separately obtained through parsing in each of the watermark detection cycles, and the method further comprises:

determining, as the watermark of the first watermarked embedded audio, an audio watermark that occurs most frequently from the audio watermarks obtained by performing the plurality of watermark detection cycles.

13. A playback terminal comprising:

a memory storing computer executable instructions; and a processor connected to the memory and configured to execute the computer executable instructions to perform operations of an audio watermark-based audio playback method comprising:

obtaining first audio in real time;

forming a first watermark embedded audio by embedding an audio watermark associated with the playback terminal into the first audio; and playing the first watermark embedded audio, wherein the embedding an audio watermark comprises:

determining a first target frame of the first audio that meets a first preset condition;

determining a second target frame of the first audio that meets a second preset condition and that is after the first target frame, wherein the first target frame is used to mark the second target frame; and embedding the audio watermark into the second target frame of the first audio; and wherein the determining a first target frame of the first audio that meets a first preset condition comprises determining the first target frame in accordance with a sampling rate of the first audio by:

determining, in accordance with the sampling rate of the first audio being greater than or equal to a first threshold, an audio frame with a maximum value of a low frequency portion in a first interval, as the first target frame; and determining, in accordance with the sampling rate of the first audio being less than a first threshold, an audio frame comprising a first characteristic sound, as the first target frame.

14. The playback terminal according to claim 13, wherein after the determining the first target frame, in accordance with the sampling rate of the first audio being greater than or equal to the first threshold, that is the audio frame with a maximum value of a low frequency portion in a first interval, the method further comprises:

adding a synchronization frame marker to the first target frame.

15. The playback terminal according to claim 14, wherein the adding comprises:

obtaining a first sampling point that is a sampling point in an intermediate frequency portion; and increasing an energy value of the first sampling point, so that a ratio of the energy value of the first sampling point to an energy value of the low frequency portion is greater than or equal to a second threshold.

16. The playback terminal according to claim 13, wherein the determining the first target frame, in accordance with the sampling rate of the first audio being less than the first threshold, that is the audio frame comprising a first characteristic sound comprises:

determining the first target frame to be, in accordance with the first characteristic sound being detected and duration of the first characteristic sound being greater than or equal to preset duration, the audio frame comprising the first characteristic sound.

17. The playback terminal according to claim 13, wherein the determining a second target frame comprises:
- determining the second target frame that is a target frame with an energy value of an intermediate frequency portion greater than or equal to a third threshold and less than a fourth threshold.

18. The playback terminal according to claim 13, wherein the embedding the audio watermark comprises:
- obtaining a first sequence corresponding to the audio watermark, wherein the first sequence comprises at least one element;
- obtaining at least one second sampling point from a third target frame; and
- embedding the at least one element in the first sequence into the at least one second sampling point, respectively, wherein the at least one element in the first sequence corresponds to the at least one second sampling point.

19. The playback terminal according to claim 18, wherein the embedding the at least one element in the first sequence into the at least one second sampling point, respectively comprises:
- adjusting an energy ratio of energy values of different portions of the second sampling point in time domain and/or frequency domain, wherein an energy ratio of one of the at least one second sampling point is associated with one of the at least one element in the first sequence.

* * * * *